Oct. 21, 1952        W. W. PORTER        2,614,379
HARVESTER FOR PEA VINES AND THE LIKE

Filed Nov. 17, 1947        14 Sheets-Sheet 1

INVENTOR.
Wellington W. Porter
BY
Frank Keefer
atty

INVENTOR.
Wellington W. Porter
BY
Frank Keifer
atty

Oct. 21, 1952 W. W. PORTER 2,614,379
HARVESTER FOR PEA VINES AND THE LIKE
Filed Nov. 17, 1947 14 Sheets-Sheet 4

INVENTOR.
Wellington W. Porter
BY
Frank Keifer
atty

Oct. 21, 1952 W. W. PORTER 2,614,379
HARVESTER FOR PEA VINES AND THE LIKE
Filed Nov. 17, 1947 14 Sheets-Sheet 6

INVENTOR.
Wellington W. Porter
BY
Frank Keifer
atty

Oct. 21, 1952 — W. W. PORTER — 2,614,379
HARVESTER FOR PEA VINES AND THE LIKE
Filed Nov. 17, 1947 — 14 Sheets-Sheet 7
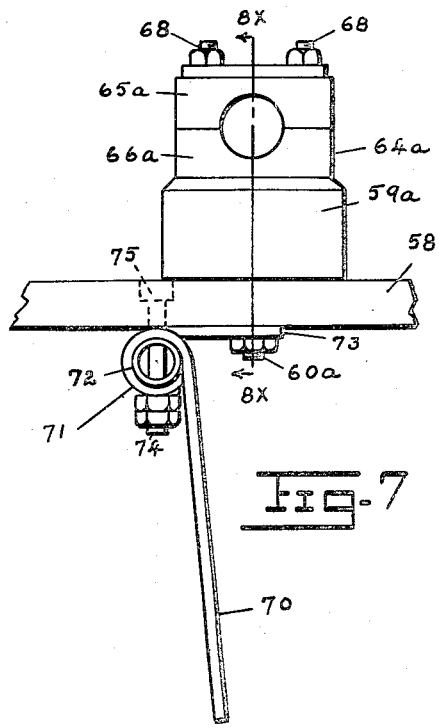
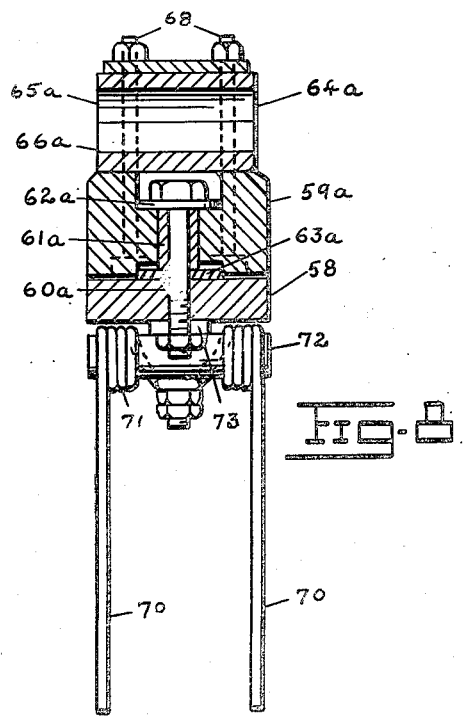
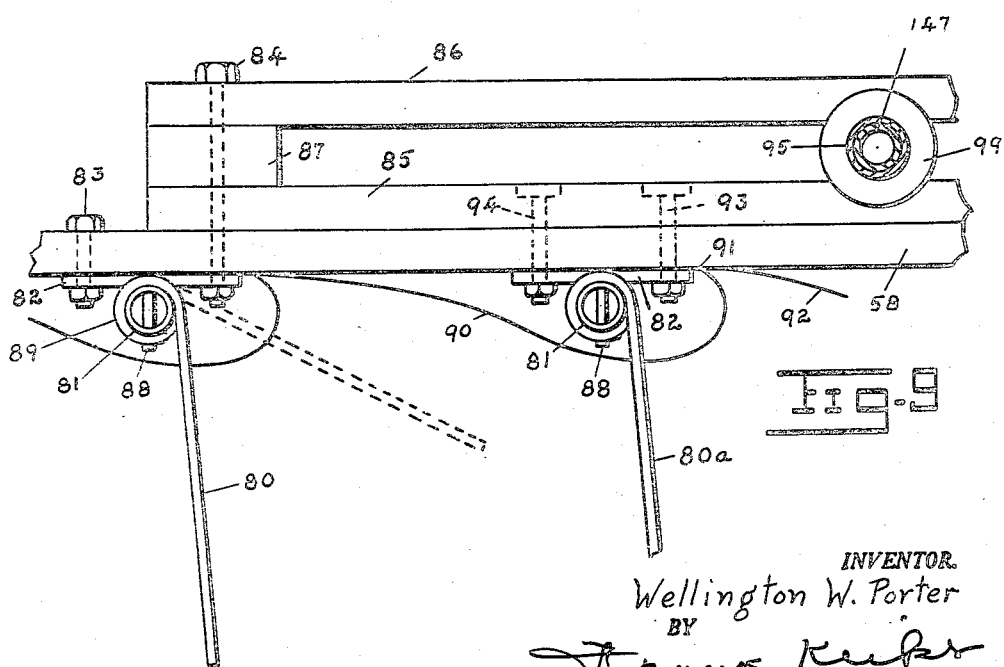

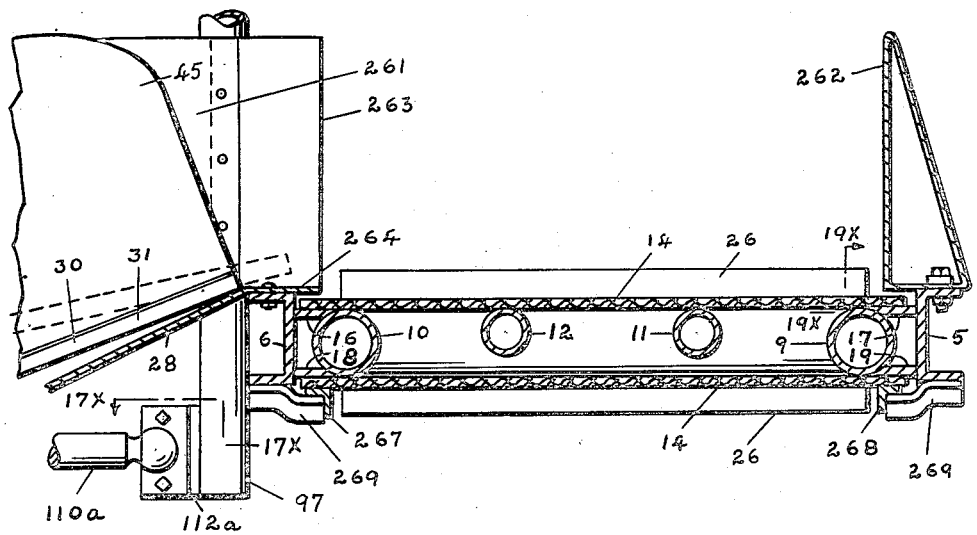
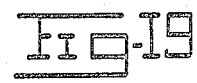
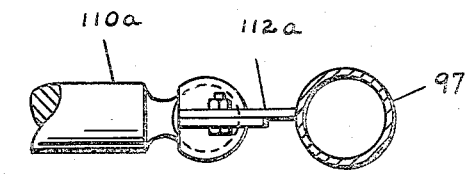
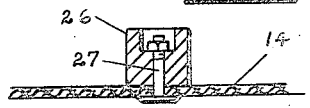
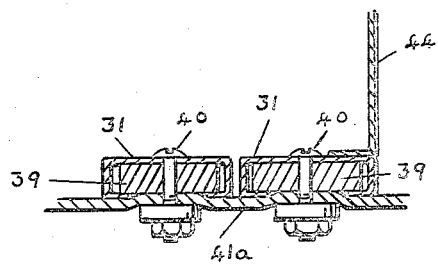
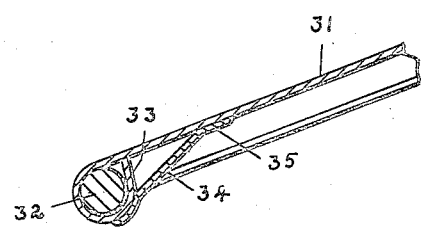

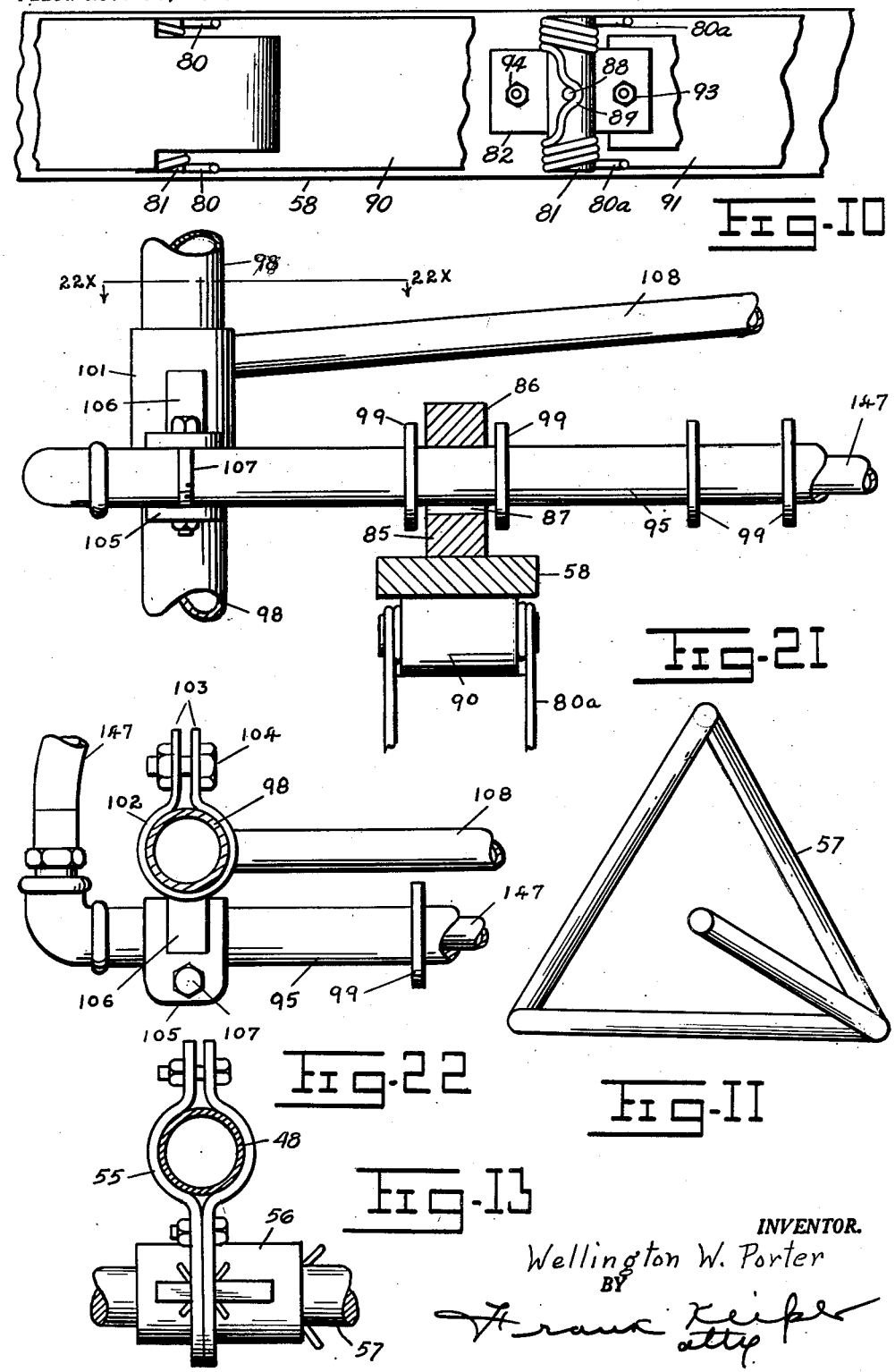

Oct. 21, 1952 W. W. PORTER 2,614,379
HARVESTER FOR PEA VINES AND THE LIKE
Filed Nov. 17, 1947 14 Sheets-Sheet 10
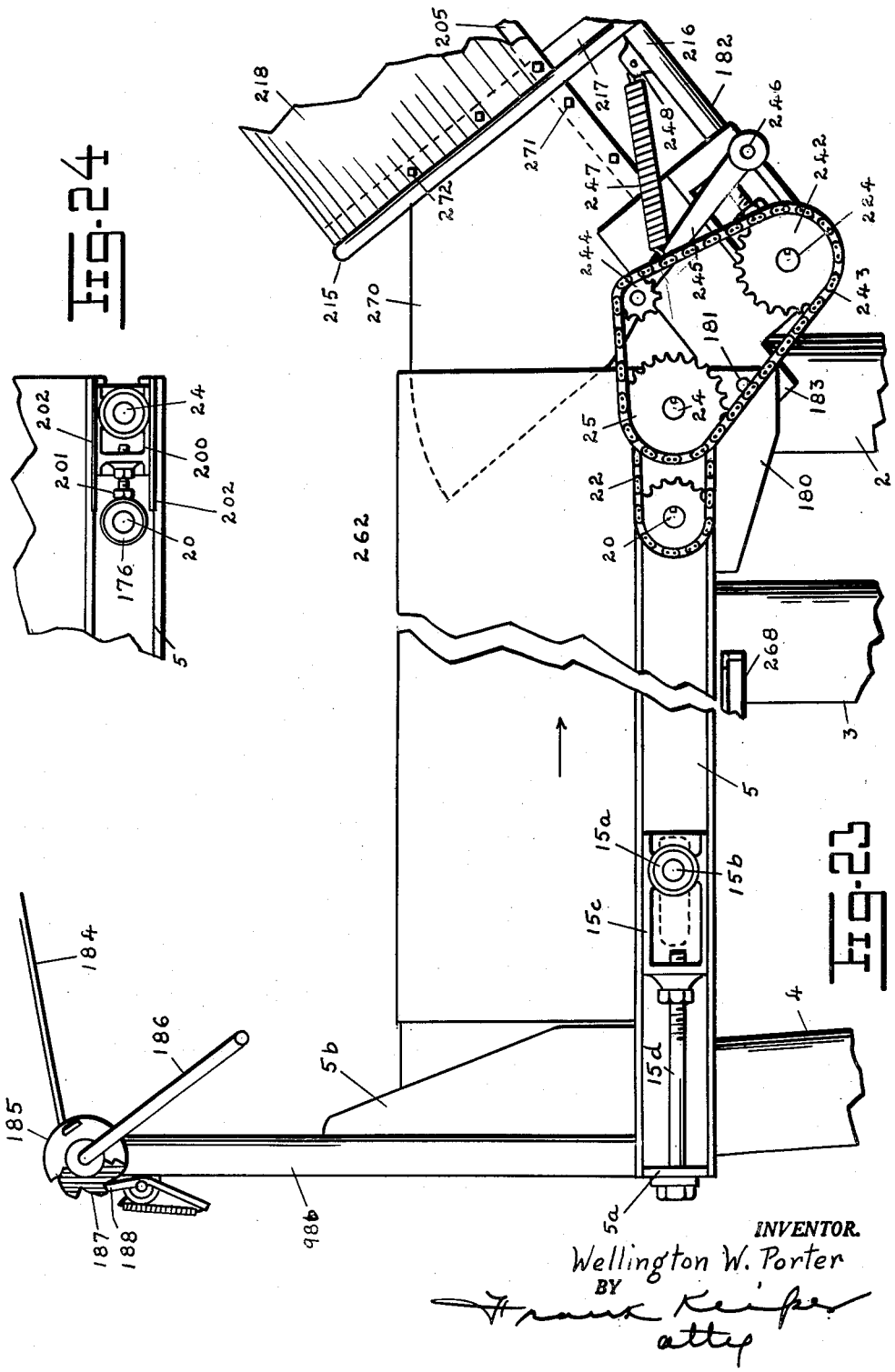
INVENTOR.
Wellington W. Porter
BY
Frank Keifer
atty Oct. 21, 1952 W. W. PORTER 2,614,379
HARVESTER FOR PEA VINES AND THE LIKE
Filed Nov. 17, 1947 14 Sheets-Sheet 11
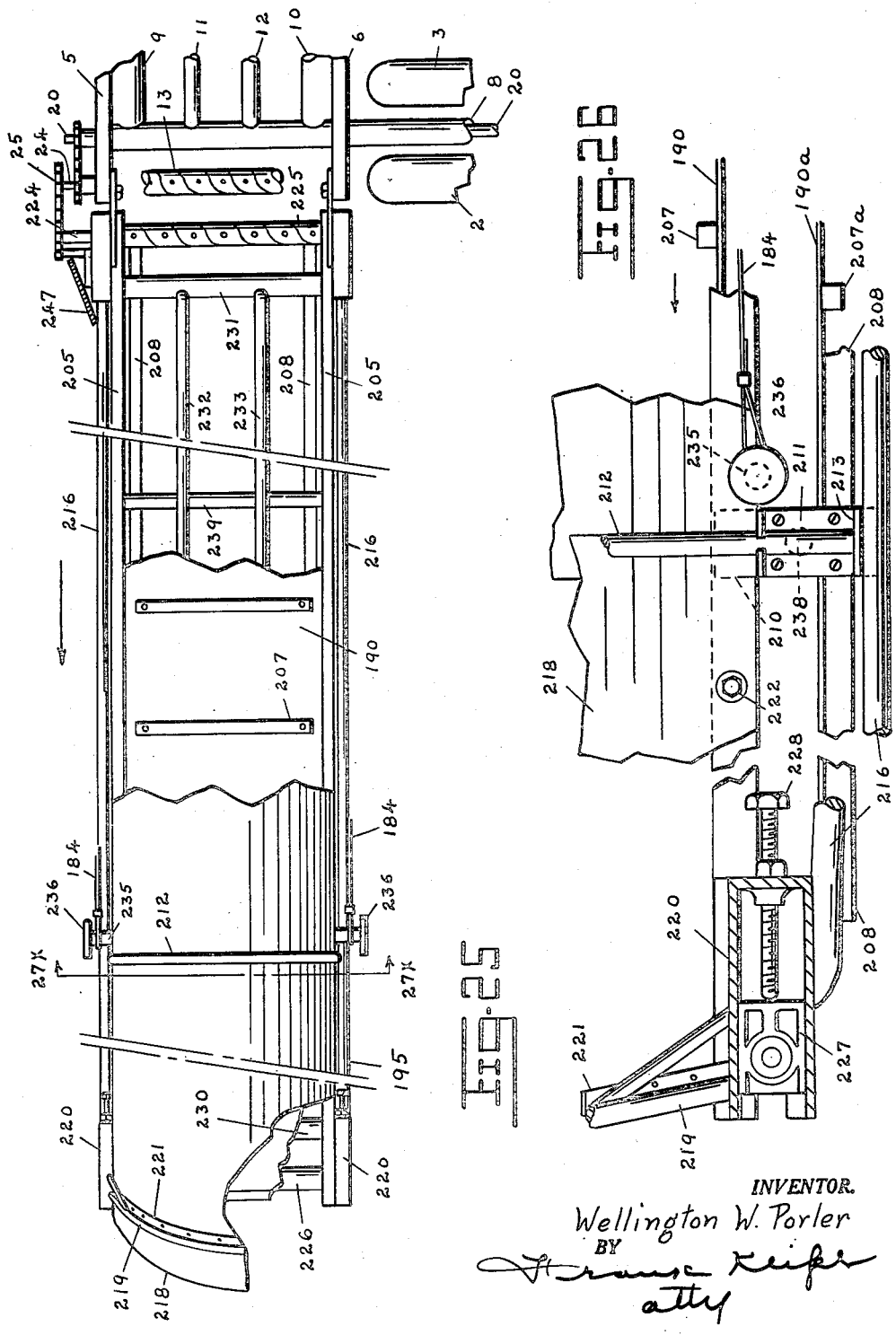
INVENTOR.
Wellington W. Porter Oct. 21, 1952 W. W. PORTER 2,614,379
HARVESTER FOR PEA VINES AND THE LIKE
Filed Nov. 17, 1947 14 Sheets-Sheet 12
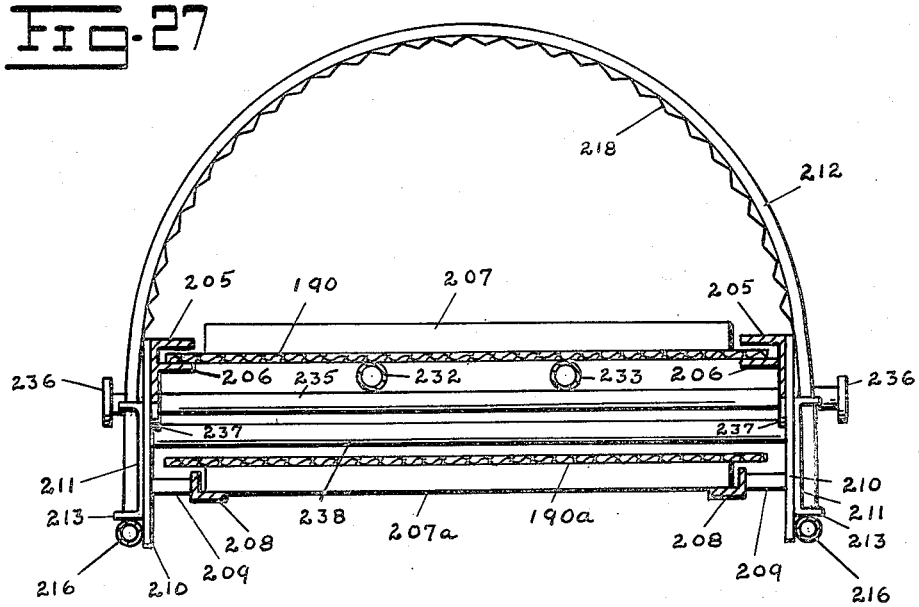
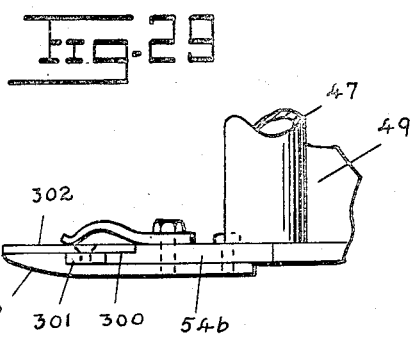
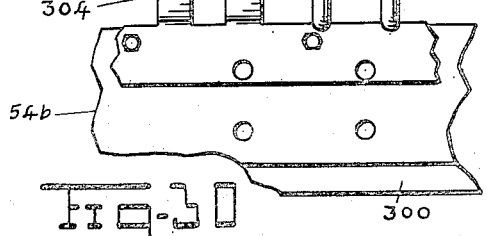
INVENTOR.
Wellington W. Porter
BY
Frank Keefer
atty

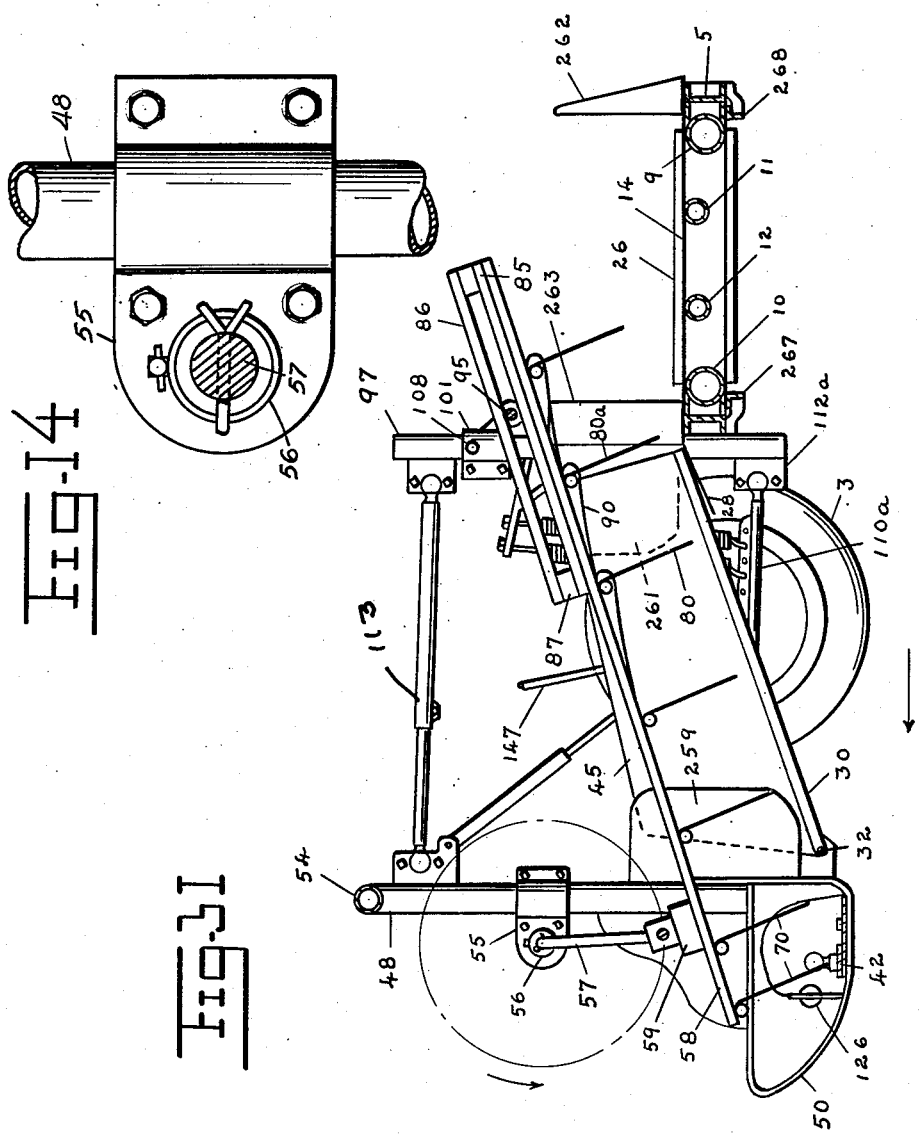

Oct. 21, 1952 W. W. PORTER 2,614,379
HARVESTER FOR PEA VINES AND THE LIKE
Filed Nov. 17, 1947 14 Sheets-Sheet 14

INVENTOR.
Wellington W. Porter
BY

Patented Oct. 21, 1952

2,614,379

UNITED STATES PATENT OFFICE 2,614,379

HARVESTER FOR PEA VINES AND THE LIKE

Wellington W. Porter, Junius, N. Y.

Application November 17, 1947, Serial No. 786,454

19 Claims. (Cl. 56—173)

The object of this invention is to provide a new and improved machine for cutting pea vines, spinach, etc.

Another object of the invention is to provide improvements on the pea harvester machine shown in my prior application 623,134 filed in the U. S. Patent Office October 18, 1945, now Patent 2,524,077.

Another object of this invention is to provide a machine that is easier running and will deliver or load the cut vines on the opposite side of the machine from that shown in my prior application.

Another object of the invention is to provide a machine that will cut the vines, spinach etc. much closer to the ground than is possible by the use of the machine shown in my prior application.

Another object of the invention is to provide a machine that will keep itself free from being clogged up.

Another object of the invention is to provide an improved form of elevator with improved gearing by which it is operated.

Another object of the invention is to provide an improved form of flexible ramp and improved form of ramp bars.

Another object of the invention is to provide a hydraulic lift by which the cutting mechanism and ramp can be lifted for the purpose of passing it over obstructions.

Another object of the invention is to provide an improved form of kicker bar.

Another object of the invention is to provide an improved frame and wheel support therefor.

Another object of the invention is to provide a machine with a flexible frame so that the cutter bars can follow closely either level or uneven ground.

Another object is to provide a machine that will not foul or injure itself by the cutter bars digging into the ground, and stalling the machine.

Another object of the invention is to provide a machine that will carry the cutter bars in a substantially horizontal position regardless of the rise and fall of the cutter bars.

Another object of this invention is to provide a machine that will cut the vines and deliver them so that they can be thrashed more easily.

These and other objects of the invention will be illustrated in the drawings described in the specification and pointed out in the claims at the end thereof.

Figure 7 is an enlarged detailed view of a kicker bar partly broken away showing the bearing connecting it to the crankshaft.

Figure 8 is a vertical section on the line $8x$—$8x$ of Figure 7.

Figure 9 is a detailed view of the kicker bar partly broken away showing the stationary bar or tube on which the rear end of each of the kicker bars slides.

Figure 10 is a bottom plan view of some of the parts shown in Figure 9, also including the stripper shield.

Figure 11 is an enlarged end view of the crankshaft.

Figure 12 shows on an enlarged scale the cutter bar and the shoe that slides on the ground and supports the right hand end of the flexible ramp shown in Figure 2.

Figure 13 is an enlarged top plan view of the bracket and bearing, which supports the crankshaft on the post.

Figure 14 is a side elevation of the parts shown in Figure 13 looking at them from the right.

Figure 15 is an enlarged side elevation of the shoe at the left of the ramp as shown in Figure 2. This shoe supports the post shown in Figures 13 and 14.

Figure 16 is a section on an enlarged scale along the line $16x$—$16x$ of Figure 2, showing the conveyor belt and a portion of the ramp and other parts immediately associated therewith.

Figure 17 is a section on an enlarged scale along the line $17x$—$17x$ in Figure 16, showing a ball and socket joint.

Figure 18 is a section on an enlarged scale through the flexible ramp, the section being taken on the line $18x$—$18x$ of Figure 2.

Figure 19 is a section on an enlarged scale along the line 19x—19x of Figure 16, showing connection between the cleats and the horizontal belt.

Figure 20 shows a section on an enlarged scale through the ramp, the section being taken on the line 20x—20x of Figure 2, showing two of the ramp bars and the flexible strip connecting them.

Figure 21 shows an enlarged view of the stationary bar on which the kicker bars slide, the section being taken on the line 21x—21x of Figure 3.

Figure 22 is a section taken on the line 22x—22x of Figure 21.

Figure 23 is an enlarged rear elevation partly broken away of the conveyor and a part of the elevator as the parts would appear when the machine is looked at from the upper side of Figure 2, the elevator being added.

Figure 24 is a side elevation of the bearing for the lag roller that drives the right hand end of the conveyor belt shown in Figure 23.

Figure 25 is a top plan view of the elevator, the frame that supports the elevator being shown at the right, and the cover plate and the elevator belt being partly broken away, portions of the elevator being sectioned out.

Figure 26 is an enlarged side elevation of a portion of the upper end of the elevator frame, the left hand end being sectioned away to show the adjustment of the bearing at the upper end of the elevator, the elevator frame being partly sectioned away.

Figure 27 is a vertical section on an enlarged scale through the elevator and frame, the section being taken on the line 27x—27x of Figure 25.

Figure 28 is a top plan view of the special stationary cutting blade used for cutting spinach.

Figure 29 is a side elevation of the assembly of the cutter blade shown in Figure 28, substituted on the stationary cutter bar.

Figure 30 shows the bottom of the ramp partly broken away and the grate that is placed in front of it to fill the opening when harvesting spinach. From the bottom of this figure the knives shown in Figure 28 are omitted.

Figure 31 is a section on the line 31x—31x of Figure 3 looking in the direction of the arrow.

Figure 1:
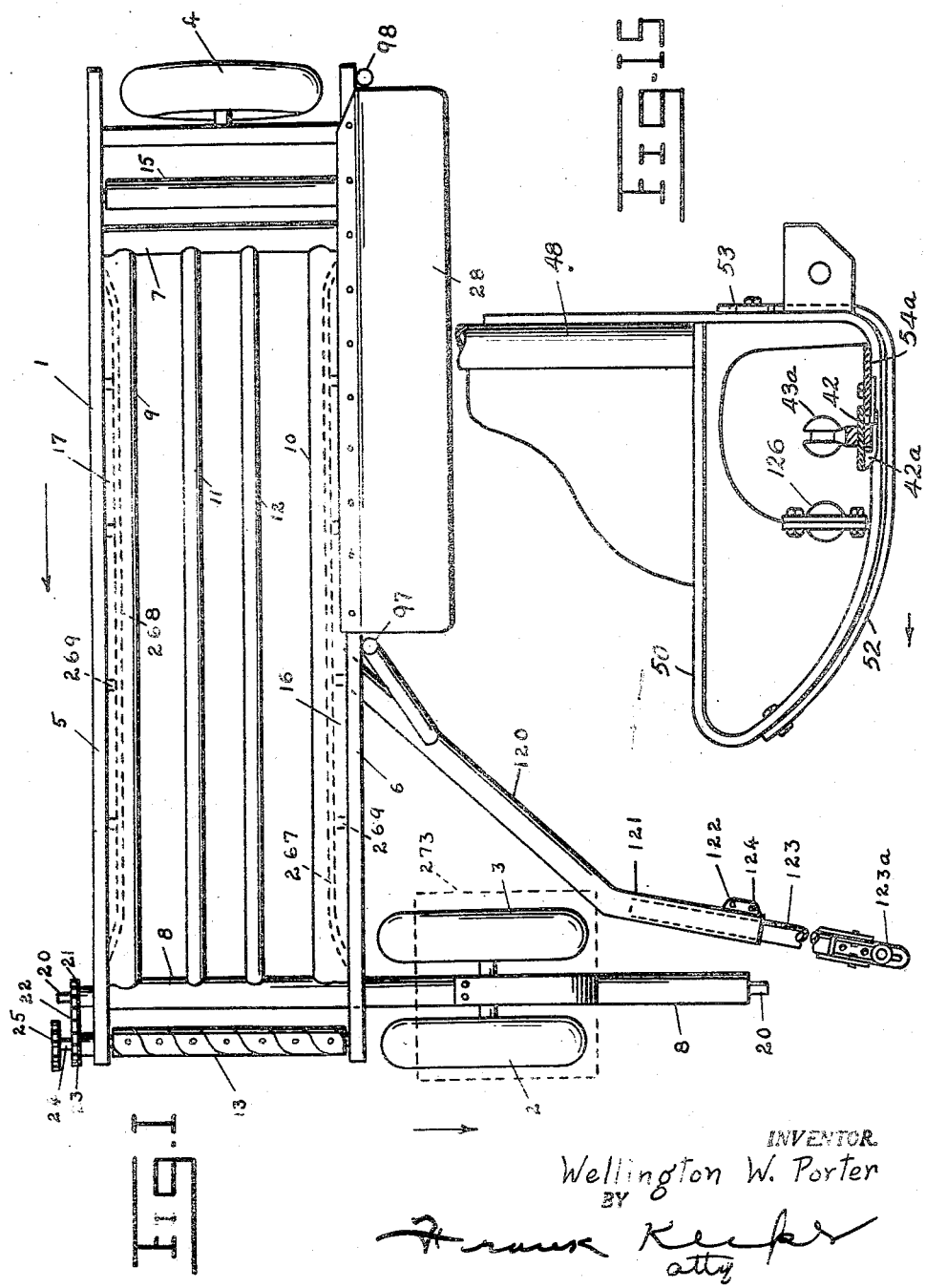
Figure 1 is a top plan view of the frame that supports the horizontal conveyor, ramp, cutter and other parts, the conveyor being omitted.

In the drawings, reference numeral 1 indicates the frame of the machine, 2 and 3 indicate the supporting wheels on one side of the machine and 4 indicates the supporting wheel on the other side of the machine.

The frame comprises the channel bars 5 and 6 which are held together at one end by short tube 7 and long tube 8 at the other end. The tube 8 passes through the channel bars 5 and 6 and is welded to both the channel bars 5 and 6. The tube 7 is also welded to channel bars 5 and 6. The tubes 7 and 8 are connected by the tubes 9 and 10 of large diameter and tubes 11 and 12 of small diameter. The connection is made by welding in each case.

Figure 2:
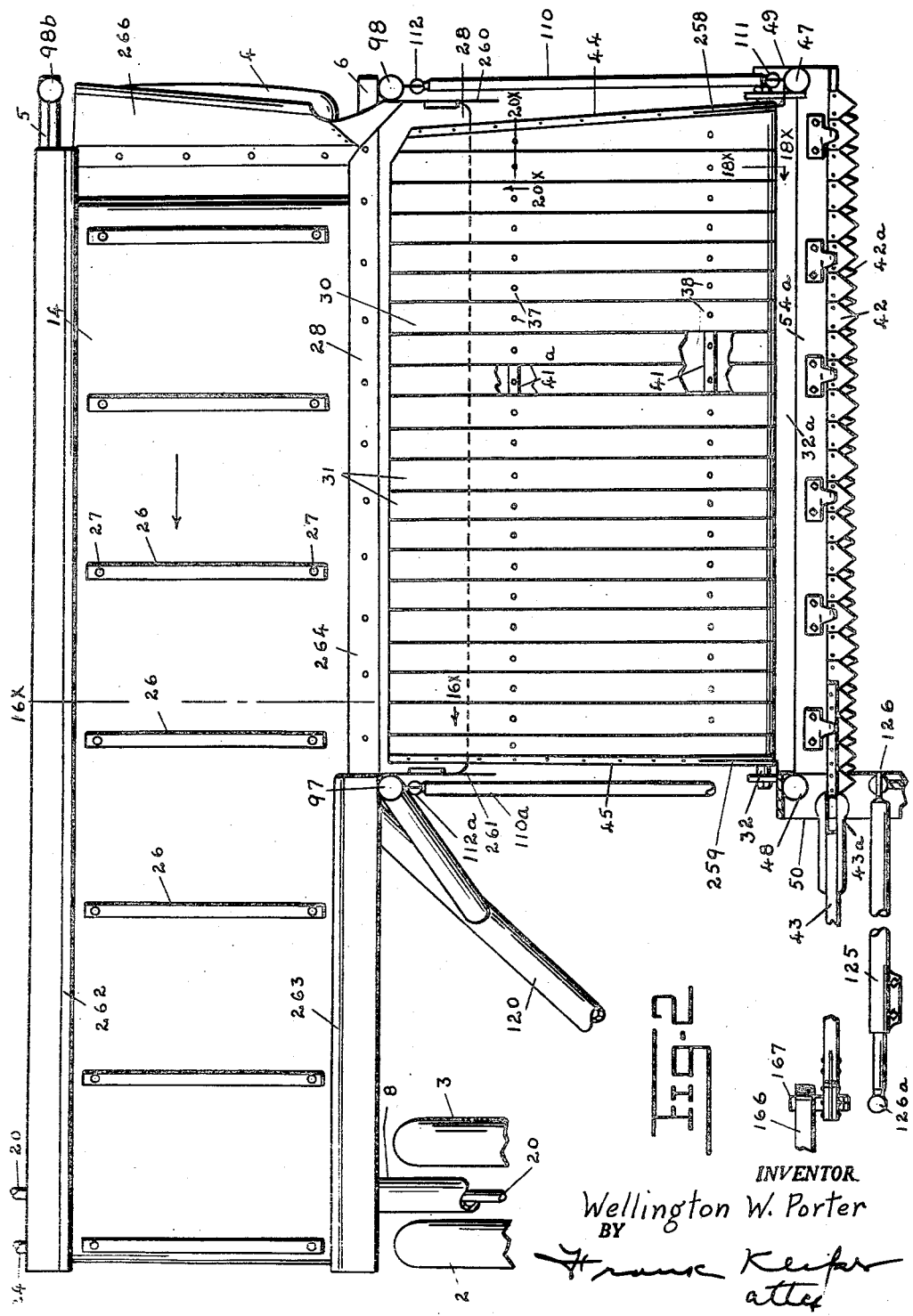
Figure 2 is an enlarged top plan view of the cutter bars, the flexible ramp and the horizontal conveyor, with parts broken away to show the construction.

On the left hand side in Figure 1 is shown a roller 13, which draws a horizontal conveyor belt 14. This belt is shown in Figure 2. The belt travels over the idle roller 15 shown in Figure 1. This belt is supported by the tubes 9, 10, 11 and 12 and to support the belt evenly, the tubes 11 and 12 of small diameter are placed so that the tops of them are on a level with the tops of the large tubes 9 and 10.

On the left hand side of the large tube 10 and on the right hand side of large tube 9 in Figure 16 is welded metal strips 16 and 17. Similar strips 18 and 19 are welded to the bottom of these tubes. These strips are welded to the large tubes on one side and to the channels on the other side and cover the opening that would otherwise be between the traveling belt 14 and the channels so that waste matter cannot find its way over the edges of the belt. If waste matter should find its way over the edge of the belt, some of it will lodge on the lower run of the belt and from there would wrap itself around the rollers building up the diameter of them and causing them to foul.

Through the long tube 8 extends a power shaft 20 which drives a sprocket 21 which in turn drives a chain 22, which in turn drives a sprocket 23. This sprocket drives a shaft 24 which drives the roller 13 which draws the belt 14. The roller 13 and shaft 24 may all be in one piece.

The shaft 24 carries the sprocket 25 which is used for the purpose of driving the elevator which will hereinafter be explained.

The horizontal conveyor belt 14 is shown in Figure 2 and is provided with cleats 26—26, which carry the vines to the left in Figure 2. The belt is preferably of heavy canvas and rubber and the cleats are fastened thereto by bolts 27 as shown in Figure 19.

Bolted to the channel 6 is an apron 28 shown in Figure 1 and shown in cross section on the left in Figure 16. This apron supports the upper end of the flexible ramp 30, which ramp is shown in Figure 2. This ramp 30 comprises twenty-one slats more or less as may be desired. The lower end of each of these slats 31 is bent around and up to form a hole or tube and through the hole at the lower end of each of these slats a round bar 32 extends, which bar makes a loose fit therewith. (See Fig. 18.) The lower end 33 of each of the slats is preferably welded to the slat of which it forms a bar. To further support the lower end of the slat, a bracket 34 is welded to the inside of the slat as indicated at 35. The lower end of bracket 34 is welded to the outside of the curved part of the slat making a brace or bridge between them. Each slat in cross section is in the form of a channel. This channel is formed from a blank, the edges of which are bent down on the intermediate part and then the edges of the channel so formed are bent inwardly to partially close the channel as shown in cross section in Figure 20. The finished slat is about three inches wide.

Each slat is perforated in two places as indicated at 37 and 38. In each slat at these perforations a block of wood 39 is inserted about three inches long, two and three quarter inches wide and about one inch thick. These blocks are slid into place from the upper end of the slat where the channel is left open. Each block is held in place by a bolt 40, which passes through the bolt holes 37 or 38 in the slats, then thru the blocks 39 and the straps 41 or 41a, then through the blocks 39 and the straps 41 or 41a.

The slats are connected together along the two lines of these bolt holes by the straps of leather 41, and 41a. Each strap is flexible so that each slat can slide up and down or endwise or sidewise with reference to its neighboring slats. These slats are formed preferably out of 20-gauge stainless steel. By holding the slats together in the manner described, the ramp is not rigid but is given a degree of flexibility that is important in the operation of the harvester as will presently be described.

The left hand end of the cross bar 32 with its adjacent shoe 50 can be lifted up as much as twenty inches, while the right hand end of the cross bar 32 and its shoe remains stationary or nearly so. In such case, the upper ends of the slats 31 on the left hand side of the ramp will slide up over the apron 28 about two inches. This movement is shown by dotted lines in Figure 16. In like manner the right hand end of the cross bar 32 with its adjacent shoe 49 can be raised up while the left hand end of the cross bar remains stationary or nearly so. In such case the upper ends of the slats 31 on the left hand side of the ramp will slide up over the apron 28 about two inches. The maximum sliding of the upper ends of the slats 31 is two inches or thereabouts. The intermediate slats will slide up in a proportionate amount to correspond. If the shoes and the cross bar 32 are raised up evenly at both ends, the upper ends of the slats will move up evenly at both ends to correspond.

Below the bar 32 is placed the stationary cutter bar 42a and on top of it is the moving cutter bar 42. The moving cutter bar is driven by a pitman 43 shown at the left in Figure 3.

Small stones and dirt can pass over the cutting bars. To keep them from getting on the ramp an open space three inches back and three inches up is left between the cutting bars and the stationary bar 32 of the ramp. This open space is indicated at 32a at the bottom of Figure 2. Pea vines and alfalfa will not pass through this open space, but will fall on the ramp because of their length and will be pushed up by the kicker bars that will presently be described.

Spinach has both long leaves and short leaves and to prevent the short leaves from falling through the open space, a grate 32b (see Figure 30) is placed in this opening when harvesting spinach. Ordinarily spinach is not raised on stony ground.

When stones of considerable size are encountered, the shoe will ordinarily ride over them and the cutter bars will frequently ride over them, but when larger stones or stumps are encountered, then the assembly is lifted by a hydraulic mechanism that is controlled by the tractor operator or driver. This will presently be described.

On the right hand side of the ramp as shown in Figure 2 is welded a slide shield 44. This shield is welded to the slat at the right hand end of the ramp and the slat in this case is tapered so that it is broad at the bottom and narrow at the top. In this way, vines as they are cut are deflected inwardly toward the center of the ramp. It will be noted that the cutter bars cut a swath that extends outside the upper end of the ramp. This provides a path for the wheel 4 shown in Figures 1 and 2 so that the wheel 4 does not run on the uncut vines.

A similar shield 45 is provided at the left hand side of the ramp shown in Figure 2. This shield is welded to the end slat in the ramp which slat has parallel sides throughout.

At the lower corners of the ramp are provided two upright posts 47 and 48. At the lower end these posts are welded to shoes 49 and 50. Protecting each of these shoes is an outside wear shoe 51 and 52. The wear shoes have a series of holes 53, therein, arranged in a vertical line so that the wear shoe can be adjusted up and down on the other shoe which is permanent. After the shoes 51 and 52 are worn out they can be replaced with new shoes. (See Figures 12 to 15 inclusive.)

The upright bars 47 and 48 are welded at the top to a horizontal bar 54 thus making a U-shaped frame.

To each of the uprights is clamped a split bracket 55 which carries a bearing 56. This bearing is preferably a roller bearing (see Figs. 13 and 14).

In these two bearings rotates the ends of the crankshaft 57. This crankshaft rotates and in its rotation operates nine kicker bars which bars are shown in top plan view in Figure 3 and are numbered 58, 59, 60, 61, 62, 63, 64, 65 and 66. This crankshaft has cranks in three positions; namely 120° apart as shown in Figure 11. The first, fourth and seventh crank will all be at one angle, the second, fifth and eighth crank will be at another angle and the third, sixth and ninth cranks will be at another angle. The kicker bars are supported by the cranks at the forward end of the ramp. Three of the kicker bars will all be in the same position.

The bearing that connects the kicker bar to the crankshaft is shown in Figures 7 and 8. In this figure the kicker bar is indicated by the reference numeral 58. On this bar is fastened a block 59a shown in section in Figure 8. The block 59a is fastened to the bar by a bolt 60a. Surrounding this bolt is a metal sleeve 61a. The block 59a is bored out to receive this sleeve. At the top and bottom of the sleeve is provided washers 62a and 63a. These washers are spaced apart by the sleeve 61a. The sleeve 61a is somewhat longer than the hole in the wooden block that receives it so that when the bolt 60a is drawn up tight the washers do not bind on the wooden block. This leaves the block 59a free to turn. On top of this block is the split bearing block 64a having the two halves 65a and 66a.

This split block is taken apart to receive the bearing surface of the crankshaft 57. The two parts of the bearing block are fastened together by four bolts 68—68. These bolts go nearly to the bottom of the block 59a. Their heads 69 are nested into holes cut in the bottom of block 59a. The four bolts tie the blocks 59a, 65a, and 66a together and permit the crankshaft to revolve in the block freely without binding. Because the block 59a can turn on the bolt 60a, the crankshaft 57 will not bind in its bearing when one end of the cutter bar is raised higher than the other. This is true of all nine of the blocks in which the crankshaft engages.

Figure 3:
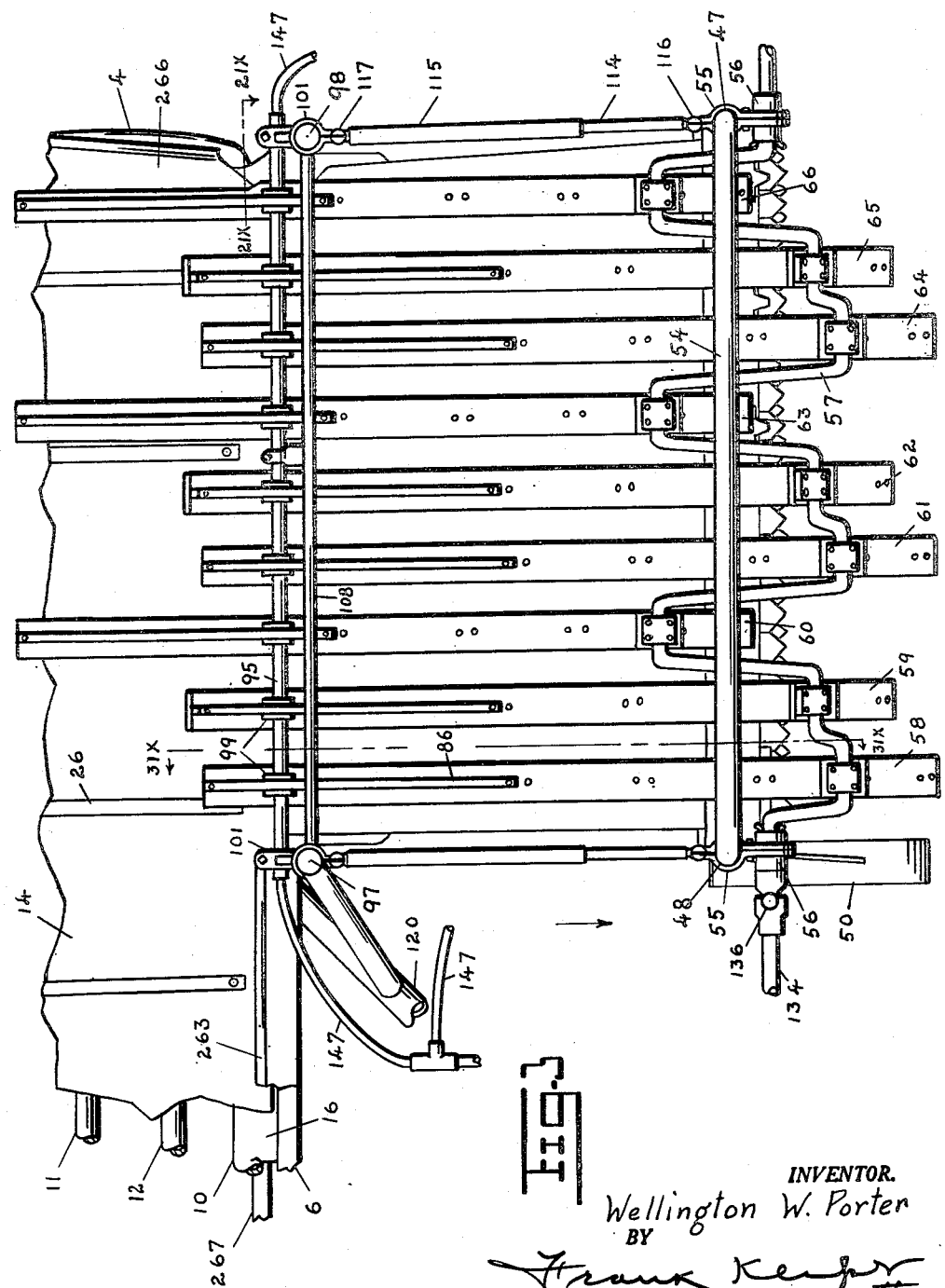
Figure 3 is a top plan view of that part of the machine containing the kicker bars which are located over the flexible ramp.

Each and all of the nine kicker bars are built alike except that the bar 66 in Fig. 3 is made narrow at the top and two prongs are omitted, and a description of one of them will do for all the rest. The kicker bar 58 has seven forks, each having two tines on it extending downwardly therefrom so as to engage the pea vines and push them up the ramp. The four forks that are nearest to the crank shaft are held practically stationary. Two of these forks are on one side of the bearing shown in Figures 7 and 31 and two are on the other side. These forks are indicated in Figures 7 and 8, by the reference numeral 70. Each fork has two tines and the two tines are joined together by a helical spring all made from one piece of wire. The spring is indicated at 71 in Figure 8. The spring is wrapped around the short tube 72. A flat strap 73 is welded centrally and tangentially to this short tube 72. See Figure 7. A hole is drilled through the tube and through this strap. The end of the strap 73 also has a hole through it, through which the bolt 60a passes. This strap is clamped against the lower side of the kicker bar, by the nut on the lower end of the bolt 60a as shown in Figure 7. The spring 71 is wrapped around the tube 72 as shown in Figure 8. The central portion of the spring engages with the bolt 74 which holds it in place with sufficient firmness. The head 75 of the bolt 74 is nested into the kicker bar 58 as shown in Figure 7 and passes down through the tube 72. The spring is first placed on the tube 72 and the strap 73 is then welded onto the tube. The hole for the bolt 74 is then drilled through the strap and tube and the assembly is then fastened to the kicker bar 58 by the bolt 74 and 60a. This assembly normally holds the tines 70 in the position shown in Figure 7. The assembly shown in Figures 7 and 31 moves counterclockwise around the fix center of the crankshaft 57 in a closed curve and as shown in Figure 7 it may be assumed that the assembly is shown at that part of the stroke of the kicker bar when it is horizontal and is moving down and to the right in the direction that will carry the pea vines up the ramp. See Figure 6.

In other words, it is moving approximately from nine o'clock to six o'clock and then to three o'clock as these numbers appear on the dial of a clock.

As the four forks push the vines up the ramp, they can yield slightly to the left from the position shown in Figure 7. As soon as the forks are lifted free from the vines they will take the normal position shown in Figure 7.

The other three forks on the kicker bar 58 are illustrated in Figures 9 and 31. These forks are mounted so that they can be sprung somewhat to the left from the full line position shown in Figure 9 when pushing the vines up the ramp but they can swing to the right freely to the dotted line position when moving in the other direction, and without pulling the vines back down the ramp.

Within these two limits the fork 80 swings on the tube 81 which tube is welded to a strap 82 which strap extends both ways from the tube 81 and is fastened to the kicker bar 58 by the short bolt 83 and by the long bolt 84. The long bolt at the left of Figure 9 passes through the kicker bar 58 and through the guide bars 85 and 86 and through the spacing block 87. A pin 88 is welded in the tube 81 and extends below it. The lower end of the pin engages the middle loop of the helical coil 89 which loop and coils are identical with the loop and coils 71 shown in Figure 8.

In like manner the fork 80a shown in Figure 9 is carried on a tube 81 welded to a strap 82 and is held in place by engagement with a pin 88. This is also shown in Figure 10, which shows the tube and strap and the helical coils of the fork of Figure 9 as viewed from the bottom.

To protect these forks from being snagged up with vines a sheet metal guard 90 is provided which is about as wide as the kicker bar except where it extends between the forks it is cut away to make room for the tines of the fork to swing. As appears at 91 the rear end of the guard 90 and the forward end of the guard 92 are both clamped under the one strap 82, so that they are held in place by a bolt 93 which fastens the strap 82 to the kicker bar 58 and to the guide bar 85. The other end of the strap 82 is held in place by the bolt 94. The heads of the bolts 93 and 94 are nested into the guide bar 85 from above so that the upper side of the guide bar itself will present no obstruction as it moves back and forth under the tube 95 shown in Figures 3, 9, 21 and 31.

It will be understood that the parts of each kicker bar that are in vertical line with the crank of the crankshaft 57 will travel in a circle as the crankshaft revolves. If both ends of the kicker bar revolve with a similar crankshaft at each end all parts of each bar would travel in a circle, but the rear end of the kicker bar slides on the tube 95 and the part of each kicker bar that engages with the tube 95 travels in a path that is somewhat distorted like a figure eight placed horizontally. The remaining parts travel in a closed curve that is more or less like a distorted oval.

Each of the kicker bars comprises a bar 58. The bar 58 in each kicker bar is about six feet long and the guide bars 85 and 86 are less than half of this length. The guide bars are about one-third of the width of the kicker bars. The guide bars are spaced apart at the front end by the block 87 and at the rear end by the block 96. These guide bars make sliding engagement with the tube 95 which is supported and connected to the upright posts 97 and 98. As there are nine kicker bars sliding on the tube 95 there are nine pairs of discs 99—99 welded on the tube 95. The kicker bar and its guide bars 85 and 86 are moved back and forth a distance equal to the diameter of the crank shaft and each of the kicker bars is held against lateral movement by the discs 99—99, so that at their rear ends the kicker bars are held to a movement with each other that is substantially parallel and at their forward ends are held to parallel movement by the blocks shown in Figure 7, which engage with the crankshaft. The discs 99—99 are welded on the tube 95 and then the guide bars 85 and 86 are brought together under and above the tube 95 and between the pair of discs 99—99. The bars 85 and 86 are spaced farther apart than the diameter of the bar 95, and these bars are somewhat narrower than the distance between the discs 99—99. This gives kickerbar freedom to twist on the bar 95 when one corner of the cutterbar and ramp is moved higher than the other.

The tube 95 is supported on the upright posts 97 and 98 by brackets, the same type of bracket 101 being used at each end. This bracket comprises a split sleeve 102, the parallel ends 103 of which are held together by the bolts 104 so that the split sleeve itself is firmly clamped on the tube of the post 98. Welded to the split sleeve is a U-shaped yoke 105 and this yoke is further reinforced by a diagonal strap 106, the upper end of which is welded to the yoke 105. The split sleeve 102 can be released by opening the bolts 104 so that the sleeve and the yoke 105 can be moved up and down on the post 98 and clamped in any elevation that may be desired.

The tube 95 is placed between the upper and lower members of the yoke 105 and is fastened in place between the members by the bolt 107. A similar bracket and yoke is placed on the post 97 and between the two of them the tube 95 is supported.

A bridge brace 108 is welded at the ends to the split sleeve 102 of the bracket 101. This brace is bent up at the middle and is connected near the middle to the tube 95 and helps to support it. In this sense it acts as a bridge. These parts are located at the upper end of the ramp. The ends of the kicker bars slide on this tube 95. At the upper or rear end of the ramp are placed the posts 97 and 98 which at the bottom are welded to the channel 6. At the top, these posts are connected by the tube 95 and brace 108 as above described. The posts 97 and 98 are fixed with relation to the conveyor 14 and its frame.

In Figure 2 the post 47 is shown at the bottom of the ramp on one side and the post 48 is shown at the bottom of the ramp on the other side. This post 47 is welded to the shoe 49 and the post 48 is welded to the shoe 50. These posts are welded at the top of the bridge 54. One end of the bar 54a is welded to the bottom of the post 47 and to the shoe 49. This appears on the right at the bottom of Figure 2 and in Figure 12. The other end of the bar 54a is welded to shoe 50, which shoe is welded to the bottom of the post 48. In this way, a rigid rectangular frame is formed comprising the shoe 49, the bar 54a and the shoe 50, all at the bottom and the upright post 48, the bridge 54 and the upright post 47.

Figure 33:
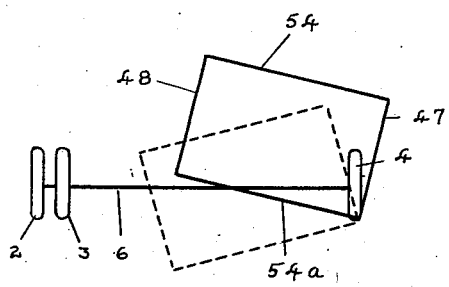
Figure 34:
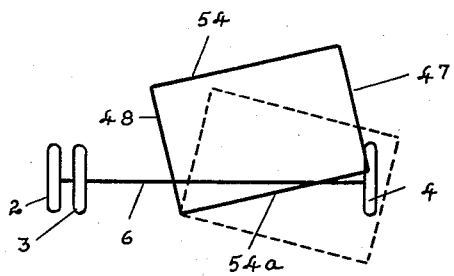

Either of the posts 47 and 48 can rise and fall with the shoe that supports it, also tilting the front frame as shown by the diagrams in Figs. 33 and 34.

The post 47 at the front and the post 98 at the rear are connected by a tie rod 110. This tie rod 110 has a ball formed on each end, one of these balls nests into a spherical recess in the bracket 111 at the front end of the tie rod and the other nests into a spherical recess provided in the bracket 112 at the rear end of the rod.

The bracket 111 is welded to the post 47. The bracket 112 is welded to the post 98. At the top a tie rod 113 is provided which is made in two parts, one of which is a rod 114 that telescopes in the split tube 115. The tube 115 is split on its open end so that it can be clamped around the rod 114, thus fixing the rod 113 at any desired length. On each end of this telescoping rod 113 is provided a ball which nests into a spherical recess.

At the front end of the ball nests into a spherical recess formed in the bracket 116 welded to the post 47 and at the rear end it nests into a spherical recess formed in the bracket 117, welded to the post 98.

Figure 6:
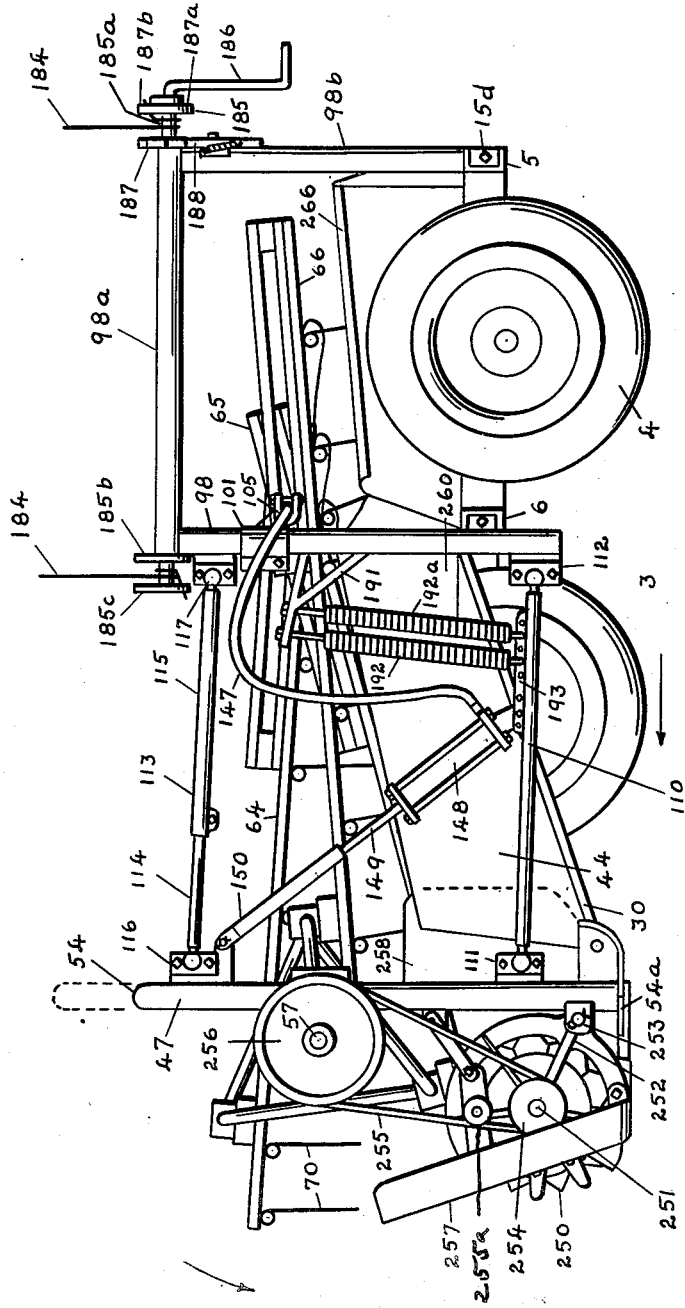
Figure 6 is a side elevation of the machine showing the assembly of the parts, it being understood that the machine travels toward the left.

The assembly above described is located at the right hand side of the ramp shown in Figure 2. A similar assembly is used on the left hand side of the ramp shown in Figures 2 and 31, the posts 48 and 97 being connected at the top and bottom in exactly the same manner as the posts 47 and 98 are connected as shown in Figure 6.

By lengthening or shortening the tie rods 113, the posts can be spread apart at the top or can be brought closer together, and this in turn will cause the posts 47 and 48 to rock around the ball joints in the brackets 111 and will cause the shoes to rest on the ground at a different angle and will place the cutter bars at a different angle to correspond with the angle that the shoes make with the ground.

Welded to the large tube 10 and passing through the channel 6 to which it is also welded is a tube 120 which for all practical purposes constitutes a part of the frame of the machine. This tube stands at an angle of 45° to the tube 10 and to the end of it is welded a tube 121, the outer end of which is split as indicated at 122 to form a split sleeve. See Figures 1 and 4. Into the open end of this split sleeve is inserted the tongue 123. The split sleeve carries bolts at 124 by which the parts of the sleeve can be drawn together so as to clamp the tongue 123 tightly therein.

The tongue 123 carries the socket 123a half of a standard trailor or tractor hitch such as is shown in Patent 2,392,063 issued to Riemann & Thorpe on January 1, 1946. The ball half being a standard part of the tractor by which the machine is drawn. The tractor supports the tongue 123 and tube 121.

Figure 4:
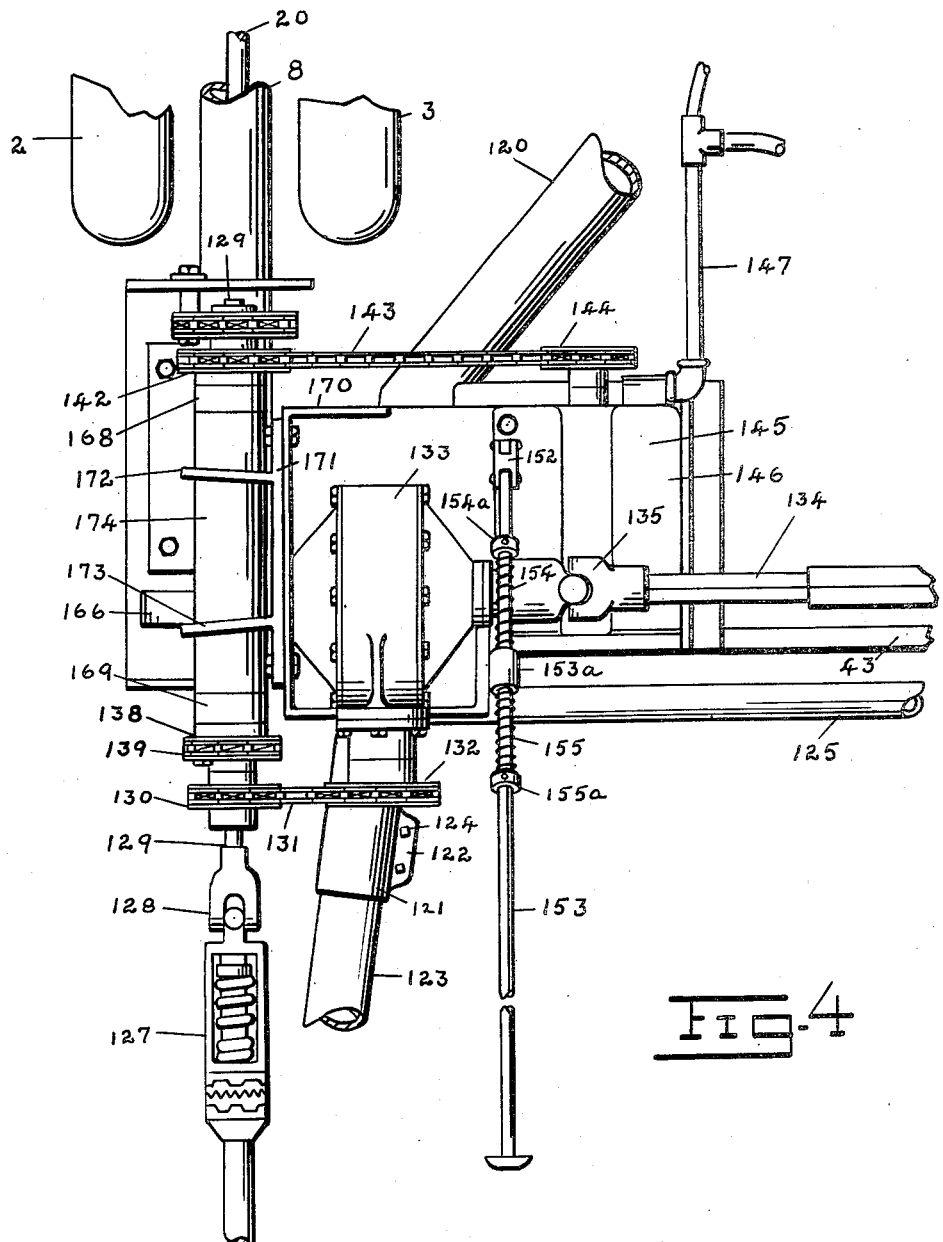
Figure 4 is a top plan view of the power transmitting elements.
Figure 5:
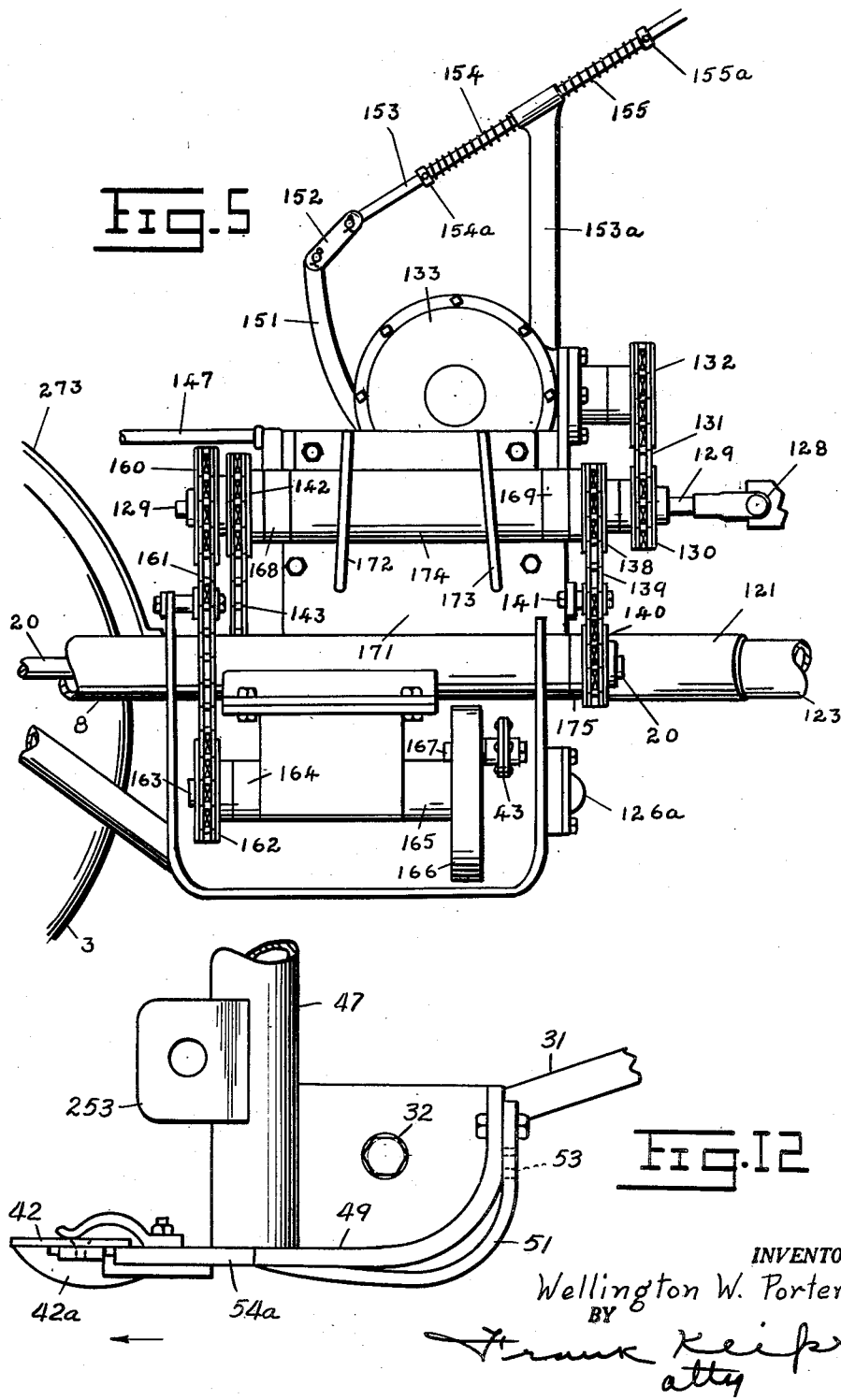
Figure 5 is a side elevation of some of the parts shown in Figure 4.

The tube 120 and 121 help to support the parts shown in Figures 4 and 5. Included with these parts is the pitman 43 shown in Figure 2 that drives the cutter bar. The tubes 120 and 121 are offset to the left in Figure 1; so that the mechanism that drives the pitman and the cutter bar is supported thereby and is sufficiently spaced from the cutter bar to give room for the pitman and the adjusting or stabilizing bar 125 which parts are sufficiently shown at the bottom of Figure 2. The bar 125 connects the shoe 50 at 126 to the belly pan at 126a in Fig. 5.

It will be understood that the ramp and the cutter bars and pitman occupy the space that is otherwise unoccupied at the bottom of Figure 1 and the pitman and the adjusting bar are so placed that they can rise and fall with the ramp and clear the parts shown in Fig. 4. They can rise and fall twenty inches more or less from the normal position that they would normally occupy when the machine is traveling on level ground, it being understood that Figure 6 represents the parts of the machine as they would normally appear when the machine is on level ground.

It will also be understood that the stabilizing bar 125 will remain at practically a uniform level at the left hand end but at the right hand end it is attached to the shoe 50 with a ball and socket joint 126 and will rise and fall with it. At the left hand end it is attached to the frame of the machine with a ball and socket joint 126a which permits the right hand end to rise and fall as above mentioned. This shoe follows ground that is even or uneven and can rise or fall as much as twenty inches from its normal position and this stabilizing bar 125 holds the shoe and the ramp and the cutter bars firmly spaced from the driving mechanism shown in Figures 4 and 5.

The following moving parts are driven by power that is taken from the tractor; namely, a slip clutch 127, a universal joint 128, a power intake shaft 129. This power intake shaft 129 drives a sprocket wheel 130 which drives a sprocket chain 131 and in turn drives a sprocket wheel 132. The sprocket wheel 132 drives reducing gears contained in the gear box 133 which in turn drives a shaft 134, the parts being so arranged that the shaft 134 makes four revolutions to one revolution of the shaft 129. The shaft 134 has a universal joint 135 at one end and a universal joint 136 at the other end. See Figures 3 and 4.

It is this shaft that drives the crankshaft 57 that in turn drives the kicker bars. The shaft 134 is composed of two parts, one of which telescopes in the other, the female and male parts both being shown in Figure 4. When the harvester is traveling on level ground the shaft 134 has its shortest length, but when the shoe 50 rises or falls the shaft 134 lengthens; that is, the distance between the universal joint 135 and the universal joint 136 increases or lengthens. In this way the angular velocity of the crank shaft which drives the kicker bars, the back and forth movement of the cutter bars is maintained regardless of the unevenness of the ground and yet the cutter bars and the forward part of the ramp follow the ground and cut the vines at an even height, so that there is no waste in cutting the vines.

On the shaft 129 is also carried a sprocket 138, which sprocket drives a chain 139, which in turn drives a sprocket 140 below it (see Figure 5), which sprocket drives a shaft 20 shown in Figures 1 and 5. This shaft extends through the tube 8, the whole length of the tube and drives the conveyor and elevator belts. An idler or chain tightener is provided between the sprocket 138 and 140 at 141 for the purpose of taking up the slack in the chain 139. This is adjustable laterally to take up the slack in the chain and is also adjustable to bring it into the same plane with the two other sprockets.

The shaft 129 shown in Figure 4 drives the sprocket 142 which in turn drives the inclined chain 143 which in turn drives the sprocket 144 on a lower level which in turn drives the hydraulic unit 145 all shown in Figure 4. See also Figure 5.

This hydraulic unit is a well-known apparatus that is made and sold by International Harvester Co. and many other manufacturers of hydraulic equipment. It is believed that this hydraulic unit is sufficiently disclosed in Patent #2,324,866 issued to Mott, July 20, 1943 and assigned to International Harvester Co.

Forming part of this hydraulic unit is two gears which are power driven and constitute a pump. These gears are enclosed in the casing 146. These gears cause oil to circulate through pipes and flexible tubes 147. The oil enters a cylinder 148 and forces a piston up in the cylinder. To this piston, not shown is attached a rod which extends through a small sleeve 149 which telescopes into a large sleeve 150. The piston rod extends up into the large sleeve 150. The piston rod pushes the large sleeve 150 upon the small sleeve 149 and away from the cylinder 148. This lifts the upright parts 47 and 48, the assembly of the shoe and the cutter bar and the flexible ramp at its lower end in front as much as twenty inches above the normal position indicated in Figure 6.

The tube 147 feeds oil under pressure to a similar assembly of cylinder piston, etc. on the other side of the machine so that the shoe cutter bar and ramp are lifted evenly on both sides or ends.

If there is a depression in the ground, the large sleeve 150 can come down on the small sleeve 149 until it contacts with the cylinder 148, which allows the assembly, above referred to, to travel down about twenty inches from the normal position shown in Figure 6.

This movement up and down of the assembly above referred to is controlled by a control lever 151 which is moved up or down by a link 152 and the rod or handle 153, the upper end of which constitutes a handle (see Figs. 4 and 5) that can be reached from the tractor seat, not shown. This handle has a travel up or down from its normal position of two inches. When it moves down it closes a valve and this causes the pump to raise the pressure in the oil tube 147 and cylinder 148. When the handle moves up it opens another valve which normally is closed to hold the pressure. The opening of the second valve releases the pressure and allows the oil to run back into the reservoir, and thereafter the oil circulates freely between the pump and the reservoir, practically without pressure.

When this machine is operated over comparatively level ground, the shoes will rest on the ground and will fix the height at which the cutter bars and the bottom of the ramp will be held.

As long as this is true the pump will cause the oil to circulate idly to the reservoir and back again, but when the harvester approaches a considerable obstruction, it will be necessary to lift the mower assembly of the shoes, the cutter bars and the lower part of the ramp momentarily until the obstruction is passed. This assembly will be lifted as much as twenty inches by the oil pressure.

As soon as the obstruction is passed the operator pulls up on the rod or handle 153 about two inches which opens the valve and allows the assembly to fall back with the shoes resting on the ground. The handle will be brought back to normal position by the springs 154 and 155 and if he lets go of the handle and does not pull the handle up the mower assembly of the shoes, cutter bars and lower end of the ramp will continue to ride forward at the elevation to which they had been raised by the oil pressure, but if he at once pulls up the handle, then the assembly drops by gravity to the ground, following the contour of the ground and goes forward cutting the vines automatically as above described.

If a depression is reached, then one shoe or the other or both will drop by gravity following the depression as the case may be and the cutter bar will follow on the ground. In such case, the shoes may be level with each other or either shoe will be lower than the other shoe and the cutter bars and the bottom of the ramp will be level or inclined in either direction to correspond.

If the wheels run on level ground, the assembly can drop as much as twenty inches below normal. In this way the assembly can travel forty inches from top to bottom by gravity if the contour permits or can be raised up again by oil pressure, or it can travel twenty inches above or below normal and will at all times be under the control of the driver except when the contour permits it to drop, and the driver does not use the oil pressure to hold it from dropping or to raise it.

If the shoe hits an obstruction that lifts it, it will lift the assembly at that end and the hydraulic unit will adjust itself to correspond.

Until the valve is closed the oil circulates through the pump itself without developing any pressure in the unit. As soon as the valve is closed by pushing down on the rod 153, then the pump developes pressure which forces the parts shown in Figure 6 to lift the assembly. When the rod 153 is pulled up it opens the valve and the gravity of the parts of the assembly causes the oil to rush back through the line and into the pump reservoir. When the assembly has been raised by the pressure developed by the pump it is held up and it can not come down unless the rod is pulled to open the valve, but it can be raised up as much as 20" by any bump in the ground over which either shoe or the cutter bar itself has to pass.

This rod or handle 153 slides in a stationary support 153a. It is held in a normal position in the support by two opposing springs 154 and 155. The inner ends of these springs abut against the support 153a and the outer ends of the springs abut against the collars 154a and 155a which are clamped on the rod 153.

These springs bear on the support with a pressure of about three pounds, which is sufficient to hold the rod or handle in a definitely fixed or neutral position. The rod can travel up or down two inches from this neutral position. This two inches of travel in either direction is fixed because at the end of that travel the coils of the spring are closed on each other. This movement of the rod down is sufficient to close one valve which causes the pump to instantly raise the pressure under which the oil circulates and this pressure at once pushes the piston up in the cylinder 148 and raises the assembly above referred to. The valve remains closed and the pump maintains the pressure and holds the assembly up if the handle merely returns to normal position.

If the handle moves up from normal position it moves the lever 151 in the opposite direction and this opens a second valve which previously had remained closed. This permits the oil, which up to that time had been under pressure to flow freely and reduces the pressure so that the assembly can return to normal position or below normal position.

In raising up the handle, the first valve above referred to will be opened so that the oil is free to circulate without pressure and this permits the assembly to drop as much as twenty inches below its normal position because the sleeve 150 can telescope down on the piston sleeve 149.

It will be understood that with the wheels traveling on level ground, the assembly above referred to can be lifted twenty inches by the oil pump to clear an obstruction and then can drop back to twenty inches and drop down twenty inches more therefrom and can be raised the last twenty inches or even forty inches in all by the hydraulic mechanism, while the wheels rest on the ground or from the lowest position of the shoes by following the ground can raise the assembly twenty inches automatically to a level and can even raise the assembly an additional twenty inches, if the contour of the ground lift the shoes to that extent while the wheels rest on the ground.

It will be understood that the assembly of the shoes and the cutter bar and the flexible ramp are held in the normal position because the shoes rest on the ground, and no pressure is needed in the oil system as long as the shoes do rest on the ground, but when the cutters approach a rock it is necessary to lift the assembly far enough so that the assembly will pass over the rock.

The oil pump lifts the assembly and holds it up when the harvester is moving on the road from one field to another, frequently at high speed. In the field, the harvester while cutting can travel up to seven miles an hour.

Figure 35:
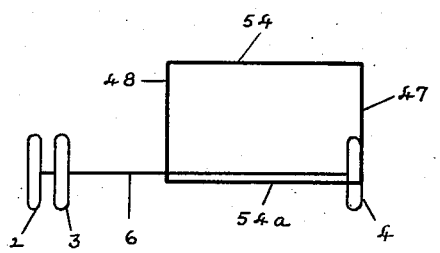
Figure 35 is a diagrammatic view of the upper elevation of the ramp and cutter bar caused by level ground or and by the hydraulic lift mechanism.

It will be understood that with wheels traveling on level ground the assembly above referred to can be lifted twenty inches by the oil pump to clear the obstruction on the ground and then can drop back twenty inches to the normal position and can drop down twenty inches more from the normal position and from its lower position it can be raised twenty inches or even forty inches in all by the hydraulic mechanism and during all this travel the wheels 2, 3 and 4 rest on the ground. See diagram Figs. 32, 35 and 36.

From the lowest position the shoes by following the ground can raise the assembly twenty inches automatically to the normal position and can even raise the assembly an additional twenty inches if the contour of the ground lifts the shoe to that extent and during all this up and down movement of the assembly, the wheels rest on the ground.

The wheels uniformly support the frame shown in Figure 1, and the assembly moves up and down with reference to the frame shown in Figure 1. It will also be understood that in Figure 16 the post 97 and the parts to the right of it remain stationary with reference to the wheels, while the ramp 30 and the bar 110a swing with the assembly of the cutter bars and the shoes.

It will be understood that the posts 97 and 98 are welded to and firmly supported by the frame shown in Figure 1. To each of these posts is welded a bracket 191, one of which brackets is shown in Figure 6 welded to the post 98. On the other side of the machine a similar bracket is welded to the post 97, Fig. 31.

Suspended from each of these brackets are two springs 192 and 192a. Welded to the bar 110 is a flange 193. In this flange is a series of holes. The lower ends of the two springs are engaged with two of the holes in the flange. The bar 110 is shown in normal position in Figure 6 and in this position the springs are placed under a tension which stretches them two or three inches. Under this tension the shoes rest lightly on the ground and support the cutter bars to correspond. The tension of the springs can be increased by moving the lower ends forward and connecting them to other holes in the flange 193 or it can be decreased by moving them back or the tension of the springs can be increased or decreased by turning the nuts at the top of the springs, which nuts rest on the bracket 191.

The tension of these springs lessens the load which the hydraulic mechanism must lift. Between the springs and the hydraulic mechanism the assembly of the shoes, cutter bar and ramp can be raised and lowered very quickly so that it practically jumps over an obstruction when going forward at the rate of six or seven miles per hour. This is done by pushing down and then pulling up the handle 153.

The arrangement of springs and hydraulic mechanism on one side of the machine shown in Figure 6 is duplicated on the other side of the machine and all of it is controlled by the one handle 153.

Referring further to the distribution of power, the power intake shaft 129 carries a sprocket gear 160 (see Figure 5). This sprocket gear is on the same shaft with the gear 142 above referred to. The sprocket gear 160 drives a chain 161, which in turn drives a gear 162, which in turn drives a shaft 163, which shaft is supported in bearing 164 and bearing 165. This shaft drives a flywheel 166. On the flywheel is carried a wristpin 167 which drives the pitman 43 in the usual well-known manner.

The shaft 129 is carried in bearings 168 and 169, as shown in Figure 5. As shown in Figure 4, a box like structure 170 is welded to the parts 8 and 121. To this box like structure is bolted a plate 171. To this plate 171 are welded the bracket plates 172 and 173. These bracket plates have holes therein through which passes the tube 174. The tube 174 is welded in these plates 172 and 173. This makes the assembly strong and rigid.

The power shaft 129 passes through the tube 174 and is supported therein by the bearings 168 and 169.

As shown in Figure 5, the tube 174 is placed over the tube 8 which is part of the frame of the machine. As shown in Figure 5, a bearing 175 is supported in one end of the tube 8 and a bearing 176 is provided at the other end of the tube 18 as shown in Figure 24, and this bearing 176 is located inside of the channel 5 at the upper left hand corner of Figure 1 where it is concealed.

In Figure 23, I have shown a horizontal frame that supports the horizontal conveyor belt. The figure shows the intermediate part of this frame broken away. The figure shows a side elevation of the channel 5, which also appears at the upper end of Figure 1, in which the wheel 4 appears at the right and in Figure 23, it appears at the left. By turning Figure 1 upside down the parts will appear in their proper sequence.

In Figure 23 appears one of the bearings 15a for the roller 15. 15b indicates the shaft that supports the roller 15 and turns in the bearing 15a. This bearing 15a is carried in a bearing shell 15c which is mounted to slide in the channel 5. The edges of the channel 5 are extended inwardly to form ridges that will hold the bearing shell 15c from falling out. The channel bars 5 and 6 are slotted to allow the roller shaft 15b to slide.

A bolt 15d passes through the upturned end 5a of the channel and is threaded into the end of the bearing shell 15c. By turning this bolt the bearing shell is moved to the right or left and puts the proper tension on the conveyor belt 14 shown in Figure 2. A similar construction is used on the other side of the machine corresponding to that shown in Figure 23. On the other end of the channel 5; namely, the discharge end, is a shaft 24, which carries the sprocket 25 which is used for the purpose of driving the elevator as has heretofore been set forth. The shaft 24 is supported by a bearing shown in Figure 24. This comprises a bearing shell 200 which in turn carries a bearing for the shaft 24. In the bearing shell 200 is threaded a bolt 201, the head of which bears against the bearing shell 176. The rods 202 are welded to the angle 5 and keeps the bearing shell 200 in place. The other end of the shaft 24 has a similar adjustable bearing. The angles 5 and 6 are slotted to permit the shaft 24 to slide. By turning this bolt the bearing shell 200 and the shaft 24 can be adjusted. This is for the purpose of moving the lag roll toward or away from the power shaft 20 thereby giving proper tension to the chain 22.

The vines are delivered from the ramp on to a horizontal belt 14. This conveyor belt can drop the pea vines on the ground in a windrow or it can discharge them onto the elevator belt 190 shown in Figures 27 and 23. The horizontal conveyor belt 14 is driven by a lag roll 13 which is fastened to the shaft 24 shown in Figure 23 and increases the diameter of it, so as to increase the frictional engagement between the roll and the belt. The lag roll 13 appears in Figure 1.

On the bottom of the horizontal frame shown in Figure 23 are two brackets 180. Each of these brackets 180 has a hole 181 therein. These brackets are on opposite sides of the frame shown in Figure 1.

The lower end 182 of the elevator frame is shown at the right in Figure 23. On the lower end of this frame two brackets 183 are placed similar to the brackets 180. Each of these brackets has a hole therein corresponding to the hole 181. The brackets 183 are inserted inside of the brackets 180, and a bolt is passed through the hole 181 and through the corresponding hole in bracket 183. These bolts are about one-and-a-half inches long.

On these bolts the elevator frame can swing up and down. Attached on each side to the upper end of the elevator frame are cables 184, which are wound on the windlass 185 by the crank 186 in the well-known manner. The windlass 185 is shown at the upper left hand corner of Figure 23 and at the top of Figure 6. On the one end of the windlass is a ratchet wheel 187, the teeth of which are engaged by a spring pressed pawl 188 in the well-known manner. Turning the windlass winds up the cables 184 and pulls up the upper end of the elevator frame 195. The windlass is supported as follows:

A horizontal tube 98a is provided welded to the top of the upright post 98 and the upright post 98b. The bottom of the upright post 98b is welded to the channel 5 and is braced on it by the triangular brace 5b welded into place.

The shaft 185a extends through the tube 98a. On the right hand end of the shaft is welded the ratchet wheel 187 and the collar 187a which together form a drum 187b.

After the shaft 185a has been passed through the tube 98a, collars 185b and 185c are welded onto the left hand end of the shaft, forming another drum, which is used for winding the second cable that holds the outer end of the elevator.

The structure of the elevator is shown in cross section in Figure 27, which section is located on Figure 25. The elevator is about sixteen feet long. On each side of the elevator is an angle 205, the size of which is one and a quarter inch by one and a quarter inch. These angles extend practically the length of the elevator. To the upright portion of the angle a metal strip 206 is welded, which strip is about one and a quarter inch wide. This strip runs the length of the angle. Between this strip 206 and the horizontal portion of the angle 205 a groove of one and a quarter inch more or less is formed. In these grooves run the edges of the elevator belt 190. The edges of the elevator belt practically fill and seal these grooves so that the vines and other products that are carried on the belt cannot work through the seal formed in this way. Otherwise they might get through under the belt and wrap themselves on the roller on which the belt travels, building up the diameter on the rollers, which would soon cause trouble in the operation of the elevator. The return run of the belt is shown at 190a. The belt is provided with cleats 207 of wood or rubber, etc. These cleats are attached the same as the cleats on the conveyor belt.

In Figure 27 are shown the angles 208, 208 which are nearly as long as the angles 205. These angles are supported by short tubes 209, 209 welded to the plates 210. See Figures 26 and 27. The plates 210 are welded to the angles 205. These angles 208 support the cleats 207a on the return run of the belt 190a. The plates 210 are about seven inches high and about three inches wide. Bolted to the plates 210 are the brackets 211, each bracket having a flange at the top and a flange at the bottom as shown in Figure 26. The flange at the top is cut away to permit the insertion of a tube 212, which tube is bent to form the arch shown in Figure 27. The lower ends of this tube 212 are welded to the lower flange of the brackets 211 at 213. Two of these bow shaped supports are used on the elevator and they are spaced about five feet apart. The width of the frame of the elevator measured on the outside of the angles 205 is about thirty and one-half inches and the length of each of the tubular arches 212 between the lower flanges of the brackets 211 is about fifty-eight inches. By unbolting the brackets 211 from the plates 210 the brackets 211 and the arch 212 can be removed.

Near the lower end of the elevator shown in Fig. 23 is a tubular arch 215. The lower ends of this tubular arch are welded to the tubes 216 which forms part of a truss that runs the length of the elevator on each side of it and which will presently be described. Welded to the arch 215 is a plate 217 which forms a flange on the arch. Fastened by bolts to this plate or flange 217 is the lower end of the cover plate 218.

At the upper end of the elevator frame is a tubular arch 219 the ends of which are welded to the top of the boxes 220, on each side of the frame. These boxes are a stationary part of the frame. Each of these boxes is channel shaped, bent from heavy metal the edges of which are further bent inwardly to partially close the channel, somewhat similar to the cross section of the slats of the ramp shown in Figure 20. Welded to the tubular arch 219 at the upper end of the frame is a plate forming a flange 221. This flange is perforated with bolt holes and to it is attached the upper end of the coverplate 218. The sides of the cover plate are attached to the angles 205 by bolts 222 placed at frequent intervals.

Before the middle arches 212 are bolted in place and before the coverplate is fastened to the elevator frame, the upper end of the coverplate is inserted under the tubular arch 219. It extends about a foot beyond the arch. The coverplate is then bolted to the flange 221. This is shown at the left hand end of Figure 25.

The lower end of the coverplate 218 is bolted to the flange 217 as shown at the right hand end of Figure 23. The sides of the cover are then bolted to the angles 205 and then the two middle arches 212 are pressed down on the cover plate and the brackets 211 are bolted to the plates 210. The cover plate is made preferably of corrugated sheet aluminum and the corrugations will spring under the pressure of the intermediate tubular arches 212 when these arches are bolted in place.

It will also be understood that the coverplate can be all in one piece or can be made in sections suitably fastened together.

As shown in Figure 23, the horizontal conveyor belt turns around the shaft 24 and the elevator belt turns around the shaft 224 both of which are shown in Figure 23. At the right hand end of Figure 25 is shown the lag roll 225, which is at the lower end of the elevator frame, which rotates in an adjustable bearing at the bottom of the elevator frame. At the upper end of the elevator frame is an idle roll 226. Both of these rolls 225 and 226 are mounted over between the angles 205 and the conveyor belt 199 of the elevator runs over these rolls.

Both of these rolls 225 and 226 rotate in adjustable bearing boxes, such as are shown at 227 at the left hand end of Figure 26. The adjustment of the bearing boxes is also shown at the left hand end of Figure 26. The adjustment of each of the bearing boxes in and out is made by the turning of the screw 228.

The sliding bearing box 227 is housed in the stationary box 229. The bolt 228 being threaded into the box 229 and bears against the sliding box 227. The face of the box 229 has been sectioned off.

The large tube 230 shown at the left in Figure 25 is welded at each end to the stationary bearing boxes 220 shown in Figures 25 and 26. In like manner the large tube 231 shown at the right of Figure 25 is welded at each end to similar stationary bearing boxes. Between the stationary bars 230 and 231 and supported thereby and welded thereto are the longitudinal and stationary tubes 232 and 233. These tubes 232 and 233 support the belt 199 as shown in Figure 27 as it travels over the rollers 225 and 226.

235 indicates a tube that extends across the frame and has a disc 236 on each end. This tube is notched into the angles 205 and half of washer 237 is welded to the bottom of the angles 205 to support the tube. The tube 235 is welded at each end to the angle 205 and to the half washer that is welded to it. To the projecting ends of the tube 235 the upper ends of the cables 184 are attached. The other ends of the cables 184 are attached to the windlass 185 shown in Figures 6 and 23. Below the tube 235 and offset from it is the tube 238, the ends of which are welded to the plates 210. See Figures 26 and 27. A similar tube 239 is placed below the tubes 232 and 233 and is welded to them. The ends of the tube 239 are welded to the angles 205 and to a plate similar to plates 210, not shown. Directly below the tube 239 is another similar tube welded between the plates 210 above referred to, but not shown.

The two pairs of tubes 235, 238 and 239, above referred to, and the tube underneath (not shown), are used for the purpose of strengthening the frame and preventing the long elevator frame from twisting.

Two tubes 216 are used, one on each under side of the elevator frame. These tubes are slightly bowed. The ends of the tubes are welded to the underside of the stationary bearing boxes 220, etc. These tubes together with the elevator frame form a truss, which stiffens the elevator frame.

It will be understood that this elevator is used to elevate and dump the vines on to a truck that runs beside and along with the harvester. At times the truck will brush against the elevator and lift it, but it will always make contact with these truss rods or tubes 216, and will not make contact with the slats 207a.

The belt on the elevator is pulled up by pulling down on the under run of the elevator belt at the bottom of the elevator. The gearing by which this is accomplished will now be described.

The under run of the elevator belt goes around the lag roll 225 shown in Figure 25. The shaft that carries the lag roll is 224 shown in Figure 23. On the shaft 224 is a sprocket 242. This sprocket is driven by a chain 243 from the sprocket 25 carried on the shaft 24, as previously described. The chain 243 runs over an idler 244 carried on an arm 245 pivoted at 246. For the purpose of keeping the tension on the chain 243, a spring 247 is used. One end of the spring 247 is attached to the arm 245 and the other end is attached to the cleat 248 welded to the tube 216, forming part of the elevator. This arrangement keeps the chain 243 tight and pulls down the under run of the belt on the elevator regardless of the angular position of the elevator.

As shown in Figure 6, a rotary knife 250 is used to cut the pea vines at the end of the cutter bars. This rotary knife rotates on a horizontal shaft 251 carried on an arm 252 supported from a bracket 253. On the shaft 251 is a pulley 254 driven by a belt 255 from a pulley 256 carried on the crank shaft 57. A shield 257 is used to keep the pea vines off the belt 255. All of this is shown at the left hand end of Figure 6. On either side of the ramp as shown in Figure 2 upright shields 44 and 45 are provided welded to the end slats on either side of the ramp. These shields keep the vines from falling over the sides of the ramp. In addition to these shields an upright supplemental shield is fastened to each of the upright posts 47 and 48. These supplemental shields 258 and 259 extend back from the posts 47 and 48 and overlap the insides of the shields 44 and 45 at the lower end. At the upper ends of the shields 44 and 48 are placed supplemental shields 260 and 261. These shields are supported by the posts 98 and 97. These shields overlap the shields 44 and 45 on the outside and are spaced from them by a wooden block of about four inches by ten inches, three-quarters of an inch thick, which blocks are fastened to the supplemental shields, and keep the metal shields from rubbing directly on each other. The four supplemental shields are firmly fastened to the four upright posts and move with or stand still with the post while the shields 44 and 45 move with or stand still with the ramp. At the back of the horizontal conveyor 14 is placed a shield 262 shown in Figures 2 and 16. This shield 262 is hollow and triangular in cross section and is fastened to the channel 5 as shown in Figure 16. This shield extends nearly the full length of the channel 5. A similar shield 263 is fastened to the channel 6 and extends from the post 97 to the left hand end of the channel 6 as shown in Figure 2. The shield 262 is made triangular in cross section for the purpose of making it stiff and strong and so that it will overlap the edge of the belt 14 as shown in Figure 16. The shield 262, angle 5 and plate 17 with the tube 9 form a seal with the right hand edge of the conveyor belt 14 and keep the vines from getting under the belt.

The apron 28 supports the top of the ramp. This apron is extended as indicated at 264 over the edge of the belt 14. This appears in Figures 2 and 16. At the left of the ramp as shown in Figure 2, the edge of the belt is covered by the triangular shaped shield 263, similar to the shields 262 in Figure 16. The extended part 264 of the apron 28 or the shield 263 together with the angle 6, the plate 16 and the tube 10 form a seal with the left hand edge of the conveyor belt.

The under run of the belt 14 runs under the tubes 9 and 10 and under the strips 16 and 17 and similar strips 18 and 19. The belt runs over the supporting angles 267 and 268, which angles run substantially the length of the frame. These angles are welded to the channels 5 and 6.

At the right hand end of the horizontal conveyor as shown in Figure 2 is a shield 266 which closes the right hand end of the horizontal conveyor and guards the supporting wheel 4.

At the lower end of the elevator frame are two shields 270, one on each side of the elevator. These shields are bolted to the angles 205 as indicated at 271. These shields extend into the cover 218 to which they are bolted as indicated at 272. These shields extend into the triangular shields 262 and 263 shown in Figure 16 and maintain engagement therewith as shown by dotted lines in Figure 23 as the elevator rises and falls.

As shown in Figure 1, by dotted lines, a fender or a guard 273 is placed over the dual wheels 2 and 3. This fender keeps dirt from getting on the drive chains which would otherwise be exposed to the dirt carried over the wheels.

The mowing mechanism includes a stationary bar and a bar that reciprocates. These are shown in Figures 2 and 12. The stationary bar runs onto the ground and the moving bar reciprocates on top of it. In order to get the stationary and the moving bar closer to the ground, I have invented a stationary bar shown in Figure 29. The stationary bar 54b has the stationary teeth 275 fastened to the under side. Each tooth has a shoulder against which the forward edge of the bar 301 engages, which bar carries the moving teeth. To this bar the stationary teeth are fastened under the bar with a shoulder on each tooth that engages against the forward edge of the stationary bar and these teeth are made narrow so that a wide space is left between the parallel sides of each two consecutive teeth, permitting the narrow teeth to sink into the ground and allows the dirt to pass between the teeth. The top side of this bar is grooved to receive the cutting bar, thus bringing both the stationary teeth and the moving teeth closer to the ground by one half or three quarters of an inch. This is important, especially in cutting spinach, which frequently does not grow high and must be cut close to the ground in order to save as much as possible for the spinach leaves. These teeth can be set so that they will cut the leaves within a quarter of an inch of the ground.

Figure 32:
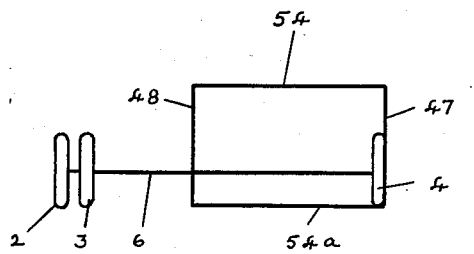
Figures 32, 33 and 34 are diagrammatic views of the positions which the cutter bars and ramp can take by gravity because of variations in the surface of the ground.
Figure 36:
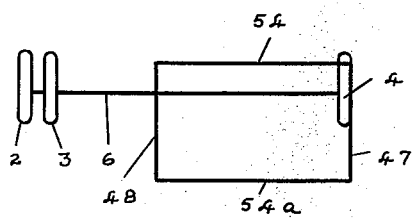
Figure 36 is a diagrammatic view of the elevation of the ramp and cutter bar caused by the ground falling away from the elevation shown in Figures 32 and 35.

It will also be understood that the front of the machine contains a rigid rectangular arch or frame such as shown diagrammatically in Figures 32, 36 inclusive and that this arch includes the bar 54 shown in Fig. 3 the upright posts 47 and 48 shown in Figure 3 and the shoes 49 and 50 shown in Figure 2. The horizontal bar 54a is welded to the shoes so that all these parts constitute a rigid frame.

When the machine as heretofore described is used for harvesting spinach it will cut the spinach about 1¼" from the ground, the same as it would cut pea vines. By tilting this frame forward at the top the tips of the cutters can be brought closer to the ground by ¼ of an inch so they will cut the vines or spinach within an inch of the ground. For cutting spinach this will not cut close enough. It is desired to cut the spinach within ½" of the ground or even closer. This I accomplish as follows:

The rectangular arch that is used in cutting peas is removed from the machine and a rectangular arch similar thereto in all respects except as follows will be substituted therefore. The bar 54a shown in Fig. 12 will be replaced by the bar 54b, which bar is cut away at 300 to form a shoulder and on this cutaway portion slides the moving cutter bar 301 and teeth 302 which for all practical purposes is the same as the cutter bar assembly 42 shown in Fig. 12. The bar 301 carries the teeth 302 and the assembly of the bar 301 and teeth 302 is indicated by 42 in Fig. 12.

Below the bar 54b is attached the stationary cutter teeth 303 shown in Fig. 28. These teeth have a shoulder which together with the forward edge of the bar 54b forms a runway for the sliding cutterbar. These stationary cutter teeth 303 are fastened to the bar 54b by bolts or in any suitable manner that will get the assembly close to the ground.

By assembling the parts in this way the cutters will cut the spinach vines within ½" of the ground and when the arch is tilted forward at the top as above pointed out, it will cut the spinach stems as close as ⅛ of an inch from the ground. In cutting peas the machine has an open space 32a between the cutter bar assembly and the bottom of the ramp. This open space is shown at the bottom of Fig. 2. To fill this open space I provide a grate 32b shown in Fig. 30. This grate keeps the spinach leaves and stems from falling thru the opening and insures their landing on the ramp. The grate bars can be made of either flat stock 304 or tubular stock 305. This grate is bolted to the bar 54b at the lower edge and at the upper edge the grate bars are welded to the bar 306 the ends of which are fastened in any suitable way between the shoes 49 and 50. It will also be understood that the bar 306 will always maintain its parallel relation to the cutter bars and will follow the front edge of the ramp.

As shown in Fig. 31 the bearing of the crankshaft 57 that operates the kicker bars is supported by brackets 55 which are clamped to the post 48, and to the part 47 not shown. These brackets are held in place by 4 bolts shown in Fig. 31. By this arrangement the brackets 55 can be set at any elevation on the posts 47 and 48 so as to give the desired clearance between the ramp and the forks on the kickerbar. A similar arrangement is shown in Fig. 31 at the rear where the brackets 101 are shown clamped to the post 97 and to the post 98 not shown. By raising and lowering the brackets 101 the bar 95 can be raised and lowered thus raising or lowering the rear ends of the kickerbar. As heretofore explained the machine comprises a rigid arch comprising the posts 47 and 48 connected by a bridge 54 at the top and connected by an assembly at the bottom which includes the bar 54a and the shoes 49 and 50. It will also be understood that in this assembly are substituted the parts that are especially named for cutting either pea vines or spinach. The arch whether used for cutting pea vines or spinach is shown diagrammatically on Figs. 32 to 36 inclusive by a rectangular frame. The various positions in which the frame is shown either is full lines or in dotted lines are the positions which the arch will assume in relation to the horizontal frame that carries the horizontal conveyor. It will also take position in between the extreme positions of the rectangular frame, it being understood that the cutter bars and the lower end of the ramp will follow the ground horizontally or will tilt at either end as shown by the position of the rectangular frame in these figures, except as the position of the rectangular frame is modified from time to time by use of the hydraulic lift. The cutter mechanism disclosed in Figures 2, 28, 29 and 30, adapted for close cutting, has been made the subject matter of a divisional application Serial No. 297,613, filed July 8, 1952.

I claim:

1. In a harvester for pea vines and the like the combination of a rigid rectangular upright frame which frame includes a shoe at each lower corner of the frame, said shoes being adapted to ride on the ground, a horizontal bar attached to said shoes and spacing them apart, an inverted U-shaped frame attached to said shoes, a second upright frame back of said first named frame and substantially parallel thereto, a rigid bar flexibly connecting said frames at the bottom on each side, a bar flexibly connecting said frames at the top on each side, said bars being independent of one another, second named said bars being adjustable lengthwise to tilt to the first named frame and its shoes with respect to the second frame, a bracket on each side of the second frame above the rigid bar, springs connecting the rigid bars and the brackets tending to lift the forward ends of the rigid bars.

2. In a harvester for pea vines and the like the combination of a rigid rectangular upright frame which frame includes a shoe at each lower corner of the frame, said shoes being adapted to ride on the ground, a horizontal bar attached to said shoes and spacing them apart, an inverted U-shaped frame attached to said shoes, a second upright frame back of said first named frame and substantially parallel thereto, a rigid bar flexibly connecting said frames at the bottom on each side, a bar flexibly connecting said frames at the top on each side, said bars being independent of one another, second named said bars being adjustable lengthwise to tilt to the first named frame and its shoes with respect to the second frame, each of said bars being connected to the frame at the ends with a ball and socket joint.

3. In a harvester for pea vines and the like the combination of a rigid rectangular upright frame which frame includes a shoe at each lower corner of the frame, said shoes being adapted to ride on the ground, a horizontal bar attached to said shoes and spacing them apart, an inverted U-shaped frame attached to said shoes, a second upright frame back of said first named frame and substantially parallel thereto, a rigid bar flexibly connecting said frames at the bottom on each side, a bar flexibly connecting said frames at the top on each side, said bars being independent of one another, second named said bars being adjustable lengthwise to tilt to the first named frame and its shoes with respect to the second frame, said bars being so mounted that said first named frame is free to tilt up and down on either side.

4. In a harvester for pea vines and the like the combination of a rigid rectangular upright frame which frame includes a shoe at each lower corner of the frame, said shoes being adapted to ride on the ground, a horizontal bar attached to said shoes and spacing them apart, an inverted U shaped frame attached to said shoes, a second upright frame back of said first named frame and substantially parallel thereto, a rigid bar flexibly connecting said frames at the bottom on each side, a bar flexibly connecting said frames at the top on each side, said bars being independent of one another, a hydraulic lift having a piston and cylinder on each side, the pistons being connected to each side of the first named frame at the top and the cylinder being supported by said rigid bars near the rear end thereof, said lift being adapted to lift the first named frame.

5. In a harvester for pea vines and the like the combination of two sections, one forward of the other, the forward section comprising a rigid rectangular upright frame, which frame includes a shoe at each lower corner of the frame, said frame being supported by said shoes, a rear frame supported by wheels, a rigid bar flexibly connecting said frames at the bottom on each side, a bar flexibly connecting said frame at the top, on each side, said bars being independent of one another, a hydraulic lift having a piston and cylinder on each side, the pistons being connected to each side of the first named frame at the top and the cylinder being supported by said rigid bars near the rear end thereof, said lift being adapted to lift the first named frame.

6. In a harvester for pea vines and the like the combination of two sections, one forward of the other, the forward section comprising a rigid rectangular upright frame, which frame includes a shoe at each lower corner of the frame, said frame being supported by said shoes, a rear frame supported by wheels and having a forward extending section at one side thereof carrying a belly pan, a rigid bar flexibly connecting said frames at the bottom on each side, a bar flexibly connecting said frame at the top, on each side, a hydraulic lift having a piston and cylinder on each side, the pistons being connected to each side of the first named frame at the top and the cylinder being supported by said rigid bars near the rear end thereof, said lift being adapted to lift the first named frame, a flexible ramp interconnecting the first and second named frames, a bar extending transversely of the ramp and connected to a shoe at one end and to the belly pan of the machine at the other end.

7. In a harvester for pea vines and the like, the combination of two sections, one forward of the other, the forward section comprising a rigid rectangular upright frame, which frame includes a shoe at each lower corner of the frame, said frame being supported by said shoes, a rear frame supported by wheels and having a forward extending portion at one side thereof, a rigid bar flexibly connecting said frames at the bottom on each side, a bar flexibly connecting said frames at the top on each side, a hydraulic lift having a piston and cylinder on each side, the pistons being connected to each side of the first named frame at the top and the cylinder being supported by said rigid bars near the rear end thereof, said lift being adapted to lift the first named frame, a flexible ramp interconnecting the first and second named frames, a bar extending transversely of the ramp and connected to the adjacent one of said shoes at one end and to said forwardly extending portion of the machine at the other end.

8. In a harvester for pea vines and the like, the combination of a rigid rectangular upright frame, which frame includes a shoe at each lower corner of the frame, said shoes being adapted to ride on the ground, a horizontal bar attached to said shoes and spacing them apart, an inverted U-shaped frame attached to said shoes, a second upright frame back of said first named frame and substantially parallel thereto, a rigid bar flexibly connecting said frames at the bottom on each side, a bar flexibly connecting said frames at the top on each side, said bars being independent of one another.

9. In a harvester for pea vines and the like, the combination of a rigid rectangular upright frame, which frame includes a shoe at each lower corner of the frame, said shoes being adapted to ride on the ground, a horizontal bar attached to said shoes and spacing them apart, an inverted U-shaped frame attached to said shoes, a second upright frame back of said first named frame and substantially parallel thereto, a rigid bar flexibly connecting said frames at the bottom on each side, and a bar flexibly connecting said frames at the top on each side, said bars being independent of one another, a bracket on each side of the second frame above the rigid bar, springs connecting the rigid bars and the brackets tending to lift the forward ends of the rigid bars.

10. In a harvester for pea vines and the like, the combination of a rigid rectangular frame, which frame includes a shoe at each lower corner of the frame, said shoes being adapted to ride on the ground, a horizontal bar attached to said shoes and spacing them apart, an inverted U-shaped frame attached to said shoes, a second upright frame back of said first named frame and substantially parallel thereto, a rigid bar flexibly connecting said frames at the bottom on each side, and a bar flexibly connecting said frames at the top on each side, said bars being independent of one another, each of said bars being connected to the frame at the ends with a ball and socket joint.

11. In a harvester for pea vines and the like, the combination of a rigid rectangular upright frame, which frame includes a shoe at each lower corner of the frame, said shoes being adapted to ride on the ground, a horizontal bar attached to said shoes and spacing them apart, an inverted U-shaped frame attached to said shoes, a second upright frame back of said first named frame and substantially parallel thereto, a rigid bar flexibly connecting said frames at the bottom on each side, and a bar flexibly connecting said frames at the top on each side, said bars being independent of one another, said bars being so mounted that said first named frame is free to tilt up and down on either side.

12. In a harvester, a main transverse frame, ground wheels on opposite ends thereof, a forward frame, substantially parallelogram linkages interconnecting said frames at opposite ends, for affording relative movement between the frames, the forward frame thereby having substantially vertical and warping movement relative to the main frame, a warpable ramp having its forward lower end carried by said forward frame, and its rearward upper end carried by said main frame, plant gathering means carried by said forward frame extending substantially the width of the ramp lower edge, and warpable means located above the ramp for moving gathered plants along and up the ramp.

13. In a harvester, a main transverse frame, ground wheels on opposite ends thereof, a forward frame, substantially parallelogram linkages interconnecting said frames at opposite ends for affording relative movement between the frames, the forward frame thereby having substantially vertical and warping movement relative to the main frame, a warpable ramp having its forward lower end carried by said forward frame, the forward edge of said ramp extending laterally across the path at the lower end over the following path of the ground wheel therebehind and having a side edge extending rearwardly and inclined laterally to a point within the wheel path, and its rearward upper end carried by said main frame, plant gathering means carried by said forward frame extending substantially the width of the ramp lower edge, and warpable means located above the ramp for moving gathered plants along and up the ramp.

14. In a harvester, a frame comprising a rearward transverse member, and a forward transverse member, spaced linkages at opposite ends connecting said members, said linkages being universally connected to said members, and one of said linkages having substantially parallel vertically spaced members, each universally connected to said members, said last named linkage limiting relative movement between said members to substantially rectilinear movement except for relative warping between the members, a cutter carried by said last named member disposed across the bottom thereof, and a warpable ramp having its lower end carried by said forward member and its upper end carried by said rearward member.

15. In a harvester, a main L frame having a transverse section, and a forward extending section at one end of the transverse section, ground wheels for said frame laterally spaced and having tread paths adjacent the opposite ends of said transverse section, a forward frame, flexibly connected laterally spaced supporting means extending between said transverse section and forward frame, means included in said last named means for restricting movement of said forward frame to substantially vertical movement and warping movement with respect to said main frame, a flexible ramp and flexible ramp feeding means interconnecting said frames, and counterbalancing means associated with said laterally spaced supporting means.

16. In a harvester, a main L frame having a transverse section, and a forward extending section at one end of the transverse section, ground wheels for said frame laterally spaced and having tread paths adjacent the opposite ends of said transverse section, a forward frame, flexibly connected laterally spaced supporting means extending between said transverse section and forward frame, means included in said last named means for restricting movement of said forward frame to substantially vertical movement and warping movement with respect to said main frame, a flexible ramp and flexible ramp feeding means interconnecting said frames, and fluid pressure expansible means connected to each of said laterally spaced supporting means for elevating either or both sides of said forward frame.

17. In a harvester, a main L frame having a transverse section, and a forward extending section at one end of the transverse section, ground wheels for said frame laterally spaced and having tread paths adjacent the opposite ends of said transverse section, a forward frame, flexibly connected laterally spaced supporting means extending between said transverse section and forward frame, means included in said last named means for restricting movement of said forward frame to substantially vertically movement and warping movement with respect to said main frame, and laterally extending means universally connecting said forward frame with said forward extending section.

18. In a harvester, a main frame, a forward frame, means universally connecting said forward frame to said main frame for substantially vertical and vertical warping movement relative to said main frame, a flexible ramp connected to one of said frames, and extending to the other, and having its lower end adjacent said forward frame, a transverse multiple throw crank shaft mounted in said forward frame above said ramp lower end, kicker bars having journals mounted on the throws of said cranks and extending rearwardly above said ramp, and swivel connecting means between said bars and journals.

19. In a harvester for pea vines and the like, the combination of a rigid rectangular upright frame which frame includes a shoe at each lower corner of the frame, said shoes being adapted to ride on the ground, a horizontal bar attached to said shoes and spacing them apart, an inverted "U" shaped frame attached to said shoes, a second upright frame back of said first named frame and subtantially parallel thereto, a rigid bar flexibly connecting said frames at the bottom on each side, a bar flexibly connecting said frames at the top on each side, said bars being independent of one another, second named said bars being adjustable lengthwise to tilt to the first named frame and its shoes with respect to the second frame.

WELLINGTON W. PORTER.

REFERENCES CITED

The following references are of record in the file of this patent:

UNITED STATES PATENTS

| Number | Name | Date |
|---|---|---|
| 540,313 | Hills et al. | June 4, 1895 |
| 735,722 | Dennis | Aug. 11, 1903 |
| 2,215,178 | Hume et al. | Sept. 17, 1940 |
| 2,295,917 | Schwan | Sept. 15, 1942 |
| 2,297,301 | Hipple | Sept. 29, 1942 |
| 2,375,848 | Hume | May 15, 1945 |
| 2,378,652 | Nobles et al. | June 19, 1945 |
| 2,419,315 | Elliott | Apr. 22, 1947 |